(12) United States Patent
Wang et al.

(10) Patent No.: US 10,516,629 B2
(45) Date of Patent: Dec. 24, 2019

(54) SYSTEMS AND METHODS IMPLEMENTING USER INTERFACE OBJECTS

(71) Applicant: NARVII INC., Medford, MA (US)

(72) Inventors: Yin Wang, Medford, MA (US); Benjamin Anderson, Malden, MA (US)

(73) Assignee: Narvii Inc., Medford, MA (US)

( * ) Notice: Subject to any disclaimer, the term of this patent is extended or adjusted under 35 U.S.C. 154(b) by 318 days.

(21) Appl. No.: 14/701,888

(22) Filed: May 1, 2015

(65) Prior Publication Data
US 2015/0334075 A1   Nov. 19, 2015

Related U.S. Application Data

(60) Provisional application No. 61/993,822, filed on May 15, 2014.

(51) Int. Cl.
| | | |
|---|---|---|
| *H04L 12/58* | (2006.01) | |
| *G06F 3/0481* | (2013.01) | |
| *H04L 29/08* | (2006.01) | |
| *G06F 3/0484* | (2013.01) | |
| *G06F 3/0488* | (2013.01) | |

(52) U.S. Cl.
CPC ........... *H04L 51/04* (2013.01); *G06F 3/0481* (2013.01); *G06F 3/0484* (2013.01); *G06F 3/04842* (2013.01); *H04L 51/046* (2013.01); *H04L 51/32* (2013.01); *H04L 67/10* (2013.01)

(58) Field of Classification Search
CPC ..... G07C 13/00; G06F 3/0488; G06F 3/0484; G06F 3/0481; G06F 3/04842; H04L 51/046; H04L 65/403; H04L 51/04; H04L 51/32; H04L 67/10
See application file for complete search history.

(56) References Cited

U.S. PATENT DOCUMENTS

| | | | |
|---|---|---|---|
| 6,230,185 B1 | 5/2001 | Salas et al. | |
| 8,504,352 B2 | 8/2013 | Wong et al. | |
| 8,701,018 B1 | 4/2014 | Keel et al. | |
| 8,984,420 B2 * | 3/2015 | Cole | H04L 51/04 715/752 |
| 9,154,456 B2 | 10/2015 | Molina et al. | |

(Continued)

OTHER PUBLICATIONS

International Search Report and Written Opinion from corresponding International Application No. PCT/US2015/028772 dated Sep. 30, 2015.

(Continued)

*Primary Examiner* — Justin R. Blaufeld
(74) *Attorney, Agent, or Firm* — Wolf, Greenfield & Sacks, P.C.

(57) ABSTRACT

According to one aspect, a system including a memory, at least one processor coupled to the memory, and a user interface component executed by the at least one processor is provided. The user interface component may be configured to present a representation of a first object within a message thread, receive, from a user, a first user interface action associated with the representation of the first object, receive, from the user, an input that causes the first user interface action to be applied to a target element associated with the chat interface, and execute the first user interface action on the target element associated with the chat interface.

24 Claims, 29 Drawing Sheets

(56) References Cited

U.S. PATENT DOCUMENTS

| | | | |
|---|---|---|---|
| 9,262,882 B2 | 2/2016 | Judd et al. | |
| 2003/0076367 A1 | 4/2003 | Bencze et al. | |
| 2003/0094489 A1 | 5/2003 | Wald | |
| 2005/0154991 A1* | 7/2005 | Jaeger | G06F 3/0481 715/769 |
| 2005/0273804 A1 | 12/2005 | Preisman | |
| 2006/0041848 A1* | 2/2006 | Lira | G06Q 10/107 715/805 |
| 2006/0059236 A1* | 3/2006 | Sheppard | H04L 51/04 709/206 |
| 2007/0150340 A1* | 6/2007 | Cartmell | G06Q 10/10 705/14.55 |
| 2007/0232292 A1 | 10/2007 | Larocca | |
| 2007/0288576 A1 | 12/2007 | Illg | |
| 2008/0013701 A1 | 1/2008 | Barhydt et al. | |
| 2008/0059986 A1 | 3/2008 | Kalinowski et al. | |
| 2008/0214214 A1* | 9/2008 | Reissmueller | G06F 3/0486 455/466 |
| 2010/0125811 A1* | 5/2010 | Moore | G06F 3/04817 715/846 |
| 2010/0138756 A1* | 6/2010 | Saund | H04L 12/1827 715/758 |
| 2010/0248788 A1* | 9/2010 | Yook | G06F 3/0481 455/566 |
| 2011/0087735 A1 | 4/2011 | Anderson | |
| 2011/0276882 A1 | 11/2011 | Buehler et al. | |
| 2011/0296319 A1 | 12/2011 | Dinan et al. | |
| 2012/0117506 A1* | 5/2012 | Koch | G06F 3/04886 715/773 |
| 2012/0129489 A1 | 5/2012 | Cassidy et al. | |
| 2012/0218190 A1 | 8/2012 | Pechanec et al. | |
| 2013/0033433 A1 | 2/2013 | Rogers et al. | |
| 2013/0093833 A1* | 4/2013 | Al-Asaaed | H04L 51/10 348/14.02 |
| 2013/0218686 A1 | 8/2013 | Muchnik et al. | |
| 2013/0316695 A1* | 11/2013 | Park | G06Q 10/10 455/419 |
| 2014/0082520 A1* | 3/2014 | Mamoun | H04M 1/72552 715/752 |
| 2014/0104162 A1 | 4/2014 | Birnbaum et al. | |
| 2014/0274280 A1* | 9/2014 | Macbeth | G07F 17/3225 463/19 |
| 2014/0298191 A1* | 10/2014 | Luu | G06F 3/04883 715/741 |
| 2015/0045641 A1 | 2/2015 | Rule | |
| 2015/0088784 A1 | 3/2015 | Dhara et al. | |
| 2015/0121291 A1* | 4/2015 | Scott | G06F 3/0236 715/780 |
| 2015/0331550 A1 | 11/2015 | Wang et al. | |
| 2015/0332534 A1 | 11/2015 | Wang et al. | |
| 2016/0007089 A1 | 1/2016 | Earley et al. | |
| 2016/0218998 A1* | 7/2016 | Sheth | G06F 3/04842 |

OTHER PUBLICATIONS

International Preliminary Report on Patentability from corresponding International Application No. PCT/US2015/028772 dated Nov. 24, 2016.

* cited by examiner

SYSTEMS AND METHODS IMPLEMENTING USER INTERFACE OBJECTS

RELATED APPLICATIONS

The present application claims priority under 35 U.S.C. § 119(e) to U.S. Provisional Application Ser. No. 61/993,822 titled "SYSTEMS AND METHODS IMPLEMENTING USER INTERFACE OBJECTS," filed on May 15, 2014, which is hereby incorporated herein by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Technical Field

The technical field relates generally to human computer interaction and, more particularly, to user interface objects that support enhanced messaging and expression of user preferences.

Discussion

The information systems and software industry has produced a wide variety of user interface elements that enable users to interact with computer systems. Examples of these user interface elements include windows, menus, icons, text boxes, radio buttons, and sliders. These user interface elements may be found executing within a variety of contexts, such as web pages rendered by a browser and specialized applications executed by mobile computing devices.

SUMMARY

According to various aspects and embodiments, an enhanced messaging system is configured to execute one or more graphical user interface (GUI) objects that interact with the user and other components of the system in an unconventional manner. More specially, in some embodiments, the enhanced messaging system executes a messaging application (e.g., a text messaging application) that implements one or more GUI objects that perform actions based on the presence or absence of representations of other GUI objects within a message thread. These actions may or may not have a visible impact on any of the representations of the GUI objects included within the message thread. For example, the actions may include movement of a representation of a GUI object from one position in the message thread to another position in the message thread. The actions may also include modification of the representation of a GUI object or the appearance of another component within the message thread. The actions may also have an impact on systems external to, but in data communication with, the computer system (e.g., social media systems, advertisement servers, and other third party systems). Examples in accord with these aspects and embodiments are described further below.

According to some aspects, a system for providing an interactive chat interface is provided. The system may include a memory, at least one processor coupled to the memory, and a user interface component executed by the at least one processor. The user interface component may be configured to present a representation of a first object within a message thread, receive, from a user, a first user interface action associated with the representation of the first object, receive, from the user, an input that causes the first user interface action to be applied to a target element associated with the chat interface, and execute the first user interface action on the target element associated with the chat interface.

According to some embodiments, the target element includes a representation of a second object. In one embodiment, the representation of the second object may be configured to receive a second user interface action and execute, in response to the execution of the first user interface action, the second user interface action. In this embodiment, the representation of the second object is configured to receive a second user interface action and execute, before the execution of the first user interface action, the second user interface action.

In one embodiment, the user interface component is configured to execute the first user interface action responsive to the representation of the first object being proximate to the target element. In this embodiment, the first user interface action is executed on a default target element. In one embodiment, the first user interface action may include an animation. In this embodiment, the animation may include a route to the target element. The route may be based on relative positions of the representation of the first object and the target element. In this embodiment, the route may be at least one of a line and a curve. In this embodiment, the user interface component may be further configured to receive a drag and drop on the representation of the first object to the target element to define the route.

In one embodiment, the first user interface action may include at least one of a sound and a vibration. In one embodiment, the target element may include at least one of user name, a user icon, a background, a keyboard button, a poll object, a variable-selection object, an image, a video, a user profile, and a message. In one embodiment, the user interface component may be further configured to restrict access to a plurality of objects including the first object, receive funds from the user for access to the plurality of objects including the first object, and allow use of the plurality of objects including the first object in response to the received funds from the user.

In one embodiment, the user interface component may be further configured to receive a duration by which the first user interface action is executed. In one embodiment, the first representation may include at least one of a bitmap image, a vector image, an animated image, a video, and a character of a special font. In one embodiment, the user interface component may further be configured to be implemented within a messaging application on a social media system. In one embodiment, the user interface component may be further configured to receive the target element from another user.

In one embodiment, the user interface component is further configured to present configuration options for the first user interface action associated with the representation of the first object, receive at least one configuration option for the first user interface action based on the presented configuration options, and update the first user interface action based on the received at least one configuration option.

According to some aspects, a graphical user interface (GUI) for providing an interactive chat is provided. The GUI may include a display on a computer system executed by at least one processor. The GUI may be configured to present a representation of a first object within a message thread, receive, from a user, a first user interface action associated with representation of the first object, receive, from the user, an input that causes the first user interface action to be applied to a target element associated with the chat interface, and execute the first user interface action on the target element associated with the chat interface.

According to some aspects, a method for providing an interactive chat is provided. The method may include presenting, by a user interface component on a mobile device, a representation of a first object within a message thread, receiving, from a user to the user interface component, a first user interface action associated with representation of the first object, receiving, from the user to the user interface component, an input that causes the first user interface action to be applied to a target element associated with the chat interface, and executing, by the user interface component, the first user interface action on the target element associated with the chat interface.

According to other aspects and embodiments, a computer system is configured to execute one or more variable-selection objects that accept user selections in a unique manner. More particularly, in some embodiments, the computer system implements one or more variable-selection objects that prompt the user to make a selection. In these embodiments, variable-selection objects are configured to change the input required to select the variable-selection object in response to receiving a selection. For example, a variable-selection object may increase the duration of an input event required to select the variable-selection object after having acknowledged a previous selection. Variable-selection objects may be employed in a variety of applications including as voting controls in polls, surveys, and contests. Within these applications, voting controls provide benefits including allowing multiple votes and avoiding accidental votes. Additional examples in accord with these aspects and embodiments are described further below.

According to some aspects, a system for processing voting interactions is provided. The system may include a memory, at least one processor coupled to the memory, and a user interface component executed by the at least one processor. The user interface component may be configured to present a plurality of representations of variable-selection objects, receive a selection of a representation of the plurality of representations from a user, the representation including an input requirement to select the representation, and change the input requirement to select the representation in response to the received selection fulfilling the input requirement.

In one embodiment, the input requirement may include a duration required for selecting the representation. In one embodiment, the user interface component configured to change the input requirement may be further configured to increase the duration required for selecting the representation. In this embodiment, the user interface component may further configured to increase the duration at least one of linearly, exponentially, according to a user input, according to a lookup table, and randomly responsive to each received selection. In one embodiment, the selection may include a touch and hold of the at least one representation. In one embodiment, the representation may include a first color and wherein the user interface component is further configured to fill the representation from bottom to top with a second color different than that color responsive to the touch and hold of the representation.

In one embodiment, the user interface component may be further configured to increase a vote count for the representation in response to the received selection fulfilling the input requirement. In one embodiment, the user interface component may be further configured to track unique selections for each of the plurality of representations. In one embodiment, the user interface component may be further configured to track total selections for each of the plurality of representations.

In one embodiment, the user interface component may be further configured to rank the plurality of representations and present the ranked plurality of representations. In one embodiment, the user interface component may be further configured to rank the plurality of representations by unique selections. In one embodiment, the user interface component may be further configured to present an element indicative of the number of selections made by each user for each of the plurality of representations. In one embodiment, the user interface component may be further configured to rank the plurality of representations by total selections for each of the plurality of representations. In one embodiment the user interface component may be further configured to change at least one of a background color of the representation and a background shape of the representation.

In one embodiment, the user interface component may be further configured to change the color of the representation in response to receiving the selection on the representation. In one embodiment, the user interface component may be further configured to update the representation to mimic a checkbox in response to receiving the selection on the representation. In one embodiment, the user interface component may be further configured to cancel the selection and present an error message in response the selection not meeting the input requirement. In one embodiment, the user interface component may be further configured to present the plurality of representations within a poll.

According to some aspects, a graphical user interface (GUI) for processing voting interactions is provided. The GUI may include a display on a computer system executed by at least one processor. The GUI may be run via a processor coupled to a memory. The GUI may be configured to present a plurality of representations of variable-selection objects, receive a selection of a representation of the plurality of representations from a user, the representation including an input requirement to select the representation, and change the input requirement to select the representation in response to the received selection fulfilling the input requirement.

According to some aspects, a method for processing voting interactions is provided. The method may include presenting a plurality of representations of variable-selection objects, receiving a selection of a representation of the plurality of representations from a user, the representation including an input requirement to select the representation, and changing the input requirement to select the representation in response to the received selection fulfilling the input requirement.

According to other aspects and embodiments, a computer system is configured to execute one or more poll objects that enable users in a multi-party messaging application (e.g., a group chat room, multiple party message thread, or the like)

to articulate preferences in a novel manner. More particularly, in some embodiments, where there are more than two users communicating in real time (or near real time) with one another, a user can create a representation of a poll object within the thread of communication. This poll object may be interactive, meaning that users may express preferences via the representation of the poll object at any time during the poll's existence. In some embodiments, the poll object updates results within its representation in real time (or near real time). In other embodiments, other users may insert new options within the representation of the poll object. Additional examples in accord with these aspects and embodiments are described further below.

According to some aspects, a system for providing voting interactions in a multi-party messaging application is provided. The system may include a memory, at least one processor coupled to the memory, and a user interface component executed by the at least one processor. The user interface component may be configured to present an interactive representation of a poll object in the multi-party messaging application, receive, from at least one user of the multi-party messaging application, a vote for an option of a plurality of options in the representation of the poll object, and update a vote count associated with the option in the representation of the poll object.

In one embodiment, the user interface component may be further configured to receive a new option from a user and add the new option to the plurality of options in the representation of the poll object. In one embodiment, the user interface component may be further configured to present an indication of the received vote on the option. In one embodiment, the user interface component may be further configured to present subsequent messages above the representation. In one embodiment, the user interface component may be further configured to present the plurality of options horizontally in the multi-party messaging application. In one embodiment, the user interface component may be further configured to present a number of votes associated with each option of the plurality of options under the option.

In one embodiment, the user interface component may be further configured to present the plurality of options vertically in the multi-party messaging application. In one embodiment, the user interface component may be further configured to present a number of votes associated with each option of the plurality of options to the right of the option. In one embodiment, the poll object may include at least one variable-selection object. In one embodiment, the user interface component may be further configured to receive a plurality of votes from a user for the option. In this embodiment, the user interface component may be further configured to track unique votes and total votes.

In one embodiment, the user interface component may be further configured to receive the vote for the option of the plurality of options from a user interface object. In one embodiment, the user interface object may include an animation. In one embodiment, the user interface component may be further configured to receive the vote from a text input of the at least one user. In one embodiment, the user interface component may be further configured to display votes received from other users in the multi-party messaging application. In one embodiment, the user interface component may be further configured to display representations of the other users in the representation of the poll object. In one embodiment, the user interface component may be further configured to present a text message and media content in the representation.

In one embodiment, the user interface component may be further configured to: receive a second vote for a second option of a plurality of options in the representation of the poll object and update a second vote count associated with the second option in the representation of the poll object.

According to some aspects, a graphical user interface (GUI) for providing a multi-party messaging application is provided. The GUI may include a display on a computer system executed by at least one processor coupled to a memory. The GUI may be configured to present an interactive representation of a poll object in the multi-party messaging application, receive, from at least one user, a vote for an option of a plurality of options in the representation of the poll object, and update a vote count associated with the option in the representation of the poll object.

According to some aspects, a method for providing a multi-party messaging application is provided. The method may include presenting, by a user interface component on a mobile device, an interactive representation of a poll object in the multi-party messaging application, receiving, from at least one user to the user interface component, a vote for an option of a plurality of options in the representation of the poll object, and updating, by the user interface component, a vote count associated with the option in the representation of the poll object.

According to one aspect, a system including a memory, at least one processor coupled to the memory, and a user interface component executed by the at least one processor is provided. The user interface component is configured to display a first representation of a first object within a message thread, move the first representation from a first location within the message thread to a second location within the message thread, and execute, responsive to the first representation being proximate to a second representation of a second object, an animation involving of the second representation.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. The patent or application file contains at least one drawing executed in color. Copies of this patent or patent application publication with color drawing(s) will be provided by the Office upon request and payment of the necessary fee.

In the figures.

DETAILED DESCRIPTION

Figure 1:
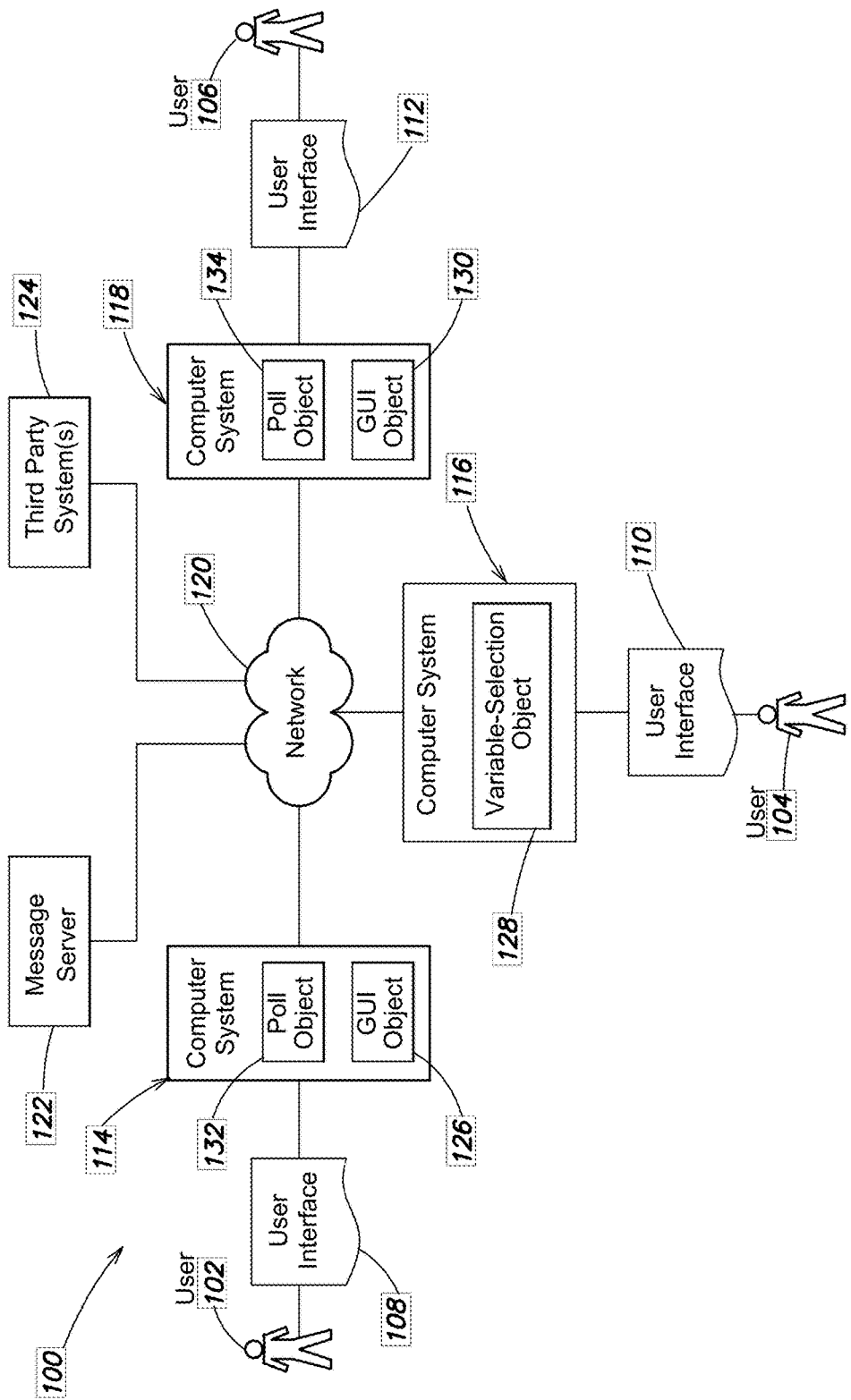
FIG. 1 is a block diagram of an enhanced messaging system.

Some embodiments disclosed herein include apparatus and processes that implement one or more GUI objects that perform actions not previously seen within the context of a communication session. For example, according to one embodiment, an enhanced messaging system is configured to implement a message thread between two or more computer systems being used by two or more users. Such a message thread may be displayed within an interface of a messaging application. The message thread may extend beyond its displayed portion and may include one or more message blocks, each of which may include a content frame.

In this embodiment, the computer systems engaged within the message thread receive input from the users. This input may include a request to execute a GUI object. Responsive to receiving such input, according to this embodiment, the computer systems may implement a representation of the GUI object identified in the input within the message thread. The implemented representation of the GUI object may be dynamic (e.g., the location or appearance of the representation may change over time) or interactive (e.g., the GUI object may perform actions in response to its representation encountering other components within the message thread, such as representation of other GUI objects). The representation may be based on information stored in a bitmap image (e.g., a JPG, PNG, etc.), a vector image (e.g., SVG, PDF, etc.), an animated image (e.g., GIF, etc.), a video (e.g., MP4, MOV, AVI, etc.), a character of a special font (e.g., Emoji, etc.), or other storage format.

Other embodiments disclosed herein include apparatus and processes that implement one or more variable-selection objects. In some embodiments, a variable-selection object is an object that varies an input required to acknowledge an attempted selection of the object based the number of previous acknowledged selections. For example, the variable-selection object may acknowledge a mouse click, a touch, or a tap as a selection where the variable-selection object has not previously detected an attempted selection. Continuing this example, the variable-selection object may further acknowledge a subsequent mouse click, touch, or tap as a selection only if the subsequent mouse click, touch, or tap is held for a predetermined duration. Alternatively, the variable-selection object may acknowledge a hover as a first acknowledged selection, but may require a double click, touch, or tap to acknowledge a second selection. In other examples, as described further below with reference to FIG. 28, the variable-selection object may require input matching a predefined shape or pattern to acknowledge a selection. In some examples, the input required to acknowledge an attempted selection may be referred to as a selection input requirement.

Variable-selection objects may be incorporated into a wide variety of user interface designs. For instance, variable-selection objects may be or may be included within the GUI objects discussed above. Alternatively, variable-selection objects may be implemented within conventional user interface elements, such as screens and windows. Some examples of such implementations are described further below.

Other embodiments disclosed herein include apparatus and processes that implement one or more poll objects. In some embodiments, a poll object presents options for selection by two or more of users within the context of a communication session between the two or more of users. For example, the poll object may present 3 options for movies playing at a local theater and ask the group to select their movie of preference for later viewing. As the poll object receives their selections, the poll object updates its representation to express the current results of the poll.

Like GUI objects and variable-selection objects, poll objects may be incorporated in a wide variety of user interface designs. It is appreciated that any of these objects may be included within an object of another type (e.g., a variable-selection object may be included in a poll object which may, in turn, be included in a GUI object). All such permutations are within the scope of the embodiments disclosed herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Enhanced Messaging System

Some embodiments disclosed herein implement an enhanced messaging system using one or more computer systems, such as the computer systems described below with reference to FIG. 2. According to these embodiments, an enhanced messaging system establishes communication sessions between a plurality of users and implements one or more GUI objects within the communication sessions. FIG. 1 illustrates an example enhanced messaging system 100. As shown in FIG. 1, the enhanced messaging system 100 includes users 102, 104, and 106, user interfaces 108, 110, and 112, computer systems 114, 116, and 118, a communications network 120, a message server 122, and one or more third party systems 124. The computer system 114 includes one or more GUI objects 126 and one or more poll objects 132. The computer system 118 includes one or more GUI objects 130 and one or more poll objects 134. The computer system 116 includes one or more variable-selection objects 128.

As illustrated in FIG. 1, the computer systems 114, 116, and 118, the message server 122, and the third party systems 124 exchange (i.e. transmit or receive) information via the network 120. The network 120 may include any communication network through which computer systems exchange information. For example, the network 120 may be a public network, such as the Internet, and may include other public or private networks such as LANs, WANs, extranets, intranets, and cloud computing systems. The network 120 may also include cellular networks such as LTE, 4G, HSDPA/HSUPA, TD-SCDMA, W-CDMA, CMDA, WiFi, Bluetooth, EvDO, GSM, iDEN networks, or any other type of communication network. Although shown as a single network in FIG. 1, in some embodiments, the network 120 includes a plurality of communication networks.

In an embodiment illustrated by FIG. 1, each of the users 102, 104, and 106 respectively interacts (e.g., provide input or receive output) with the user interfaces 108, 110, and 112. Each of the computer systems 114, 116, and 118 is configured to respectively implement each of the user interfaces 108, 110, and 112. In some embodiments illustrated by FIG. 1, the user interfaces 108, 110, and 112 are browser-based user interfaces served by the message server 122. In other embodiments, the user interfaces 108, 110, and 112 are implemented as components within social media systems, such as the FACEBOOK social networking system available online from Facebook Inc. of Menlo Park, Calif. In still other embodiments, the user interfaces 108, 110, and 112 are specialized client programs that execute outside of a browser environment, such as an application program executing on a mobile device. The user interfaces 108, 110, and 112 may be implemented using a variety of technologies and may include sundry elements (e.g., screens, windows, buttons, boxes, etc.) arranged according to various user interface metaphors. As described further below, FIGS. 3-12, 14-17, and 21-24 further illustrate some of the elements and objects (e.g., the GUI objects 126 and 130, the variable-selection object 128, and the poll objects 132 and 134) used to implement the user interfaces 108, 110, and 112.

In some embodiments, the computer systems 114, 116, and 118 are configured to exchange information with the message server 122 via the network 120 when establishing or otherwise implementing communication sessions involving the user interfaces 108, 110, and 112. For instance, in one embodiment, a computer system (e.g., the computer system 114) initiating a communication session (e.g., a text message thread) communicates a request for one or more identifiers to the message server 122. In response to receiving the request, the message server 122 transmits a response that includes the requested identifiers, if the requested identifiers are stored in a directory accessible by the message server 122. In response to receiving the identifiers in the response, the computer system initiating the communication session contacts one or more computers identified in the response and executes a communication session involving each computer system. This communication session may include the GUI objects disclosed herein.

In another embodiment, the message server 122 serves an even more prominent role in that the message server 122 acts as a centralized relay for transmissions from each of the computer systems 114, 116, and 118 engaged in a communication session. In this embodiment, the message server 122 receives transmissions from each of the computer systems 114, 116, and 118 via the network 120 and relays the transmissions to the destination computer system identified in the message. In another embodiment, the message server 122 only receives transmissions from computer systems 114, 116, and 118 where the computer system attempting a transmission is unable to complete the transmission. In this embodiment, the message server 122 acts a storehouse of undeliverable transmissions and periodically attempts to deliver them. In still another embodiment, the computer systems 114, 116, and 118 do not communicate with the message server 122 at all, but rather establish and execute communication sessions directly with one another via the network 120.

In some embodiments, the computer systems 114, 116, and 118 exchange information with the third party systems 124. Examples of the third party systems 124 include advertisement servers, the FACEBOOK social networking system, the TWITTER social networking and microblogging service available online from Twitter, Inc. of San Francisco, Calif., the FOURSQUARE location based social network system available online from Foursquare Labs, Inc. of New York, N.Y., the GOOGLE+ social networking system available online from Google Inc. of Mountain View, Calif., the LINKEDIN social networking system available online from Linkedin Corporation of Mountain View, Calif., mailing lists, email systems, texting systems, telephone systems, and the like. The information exchanged between the computer systems 114, 116, and 118 and the third party systems 124 may include data descriptive of identified users of the computer systems 114, 116, and 118, such as indications of the validity of logon credentials, account information, and profile information, as well as data descriptive of the social network to which the identified users belong, such as groups, friends, followers, other users commented on by the identified users, or other users who authored comments associated with the identified users. The information exchanged between the computer systems 114, 116, and 118 and the third party systems 124 may further include activity conducted by users of the computer systems 114, 116, and 118, such as activating particular GUI objects or interacting with a variable-selection object in a predefined manner.

In other embodiments, the third party systems 124 include financial systems, payment networks, and issuing banks. Examples of these financial systems include the PAYPAL system available online from PayPal, Inc. of San Jose, Calif., the YODLEE system available from Yodlee, Inc. of Redwood City, Calif., the DWOLLA system available from Dwolla Inc. of Des Moines, Iowa, and the like. Examples of payment networks 126 include VISANET available from Visa, Inc. of San Francisco Calif., BANKNET available from MasterCard International Incorporated of Purchase, N.Y., and the like. Examples of issuing banks include Citibank N.A. of New York, N.Y., Capital One Financial Corporation of Richmond, Va., JPMorgan Chase & Co. of New York, N.Y., Bank of America Corporation of Charlotte, N.C., and the like. Example financial systems also include escrow and payment processor services available from Balanced of Palo Alto, Calif. The information exchanged between the computer systems 114, 116, and 118 and the financial systems may include data descriptive methods of payment utilized by identified users and data descriptive of transactions conducted by the identified users.

In some embodiments, the GUI objects 126 and 130 are configured to be implemented within the user interfaces 108 and 112. The GUI objects 126 and 130 may include, for example, executable code and data structures that, when executed and utilized by at least one processor of the computer systems 114 and 118, render graphical representations of the GUI objects 126 and 130 within the user interfaces 108 and 112. A user, such as the user 102 or the user 106, may interact with these representations and may activate them as discussed further below. The representations of the GUI objects 126 and 130 may include a wide variety of forms, colors, and characteristics. In addition, dynamic and interactive features of the GUI objects 126 and 130 may alter these forms, colors, and characteristics.

In various embodiments, the dynamic and interactive features of a GUI object are controlled by values of one or more configurable parameters. These values may be default values or values configured by a user, for example during the processes of activating a GUI object within the message thread. Examples of the attributes of features that may be controlled by configurable parameters include a target of an action executed by a GUI object, a route traveled by a representation of a GUI object between a first position in the message thread and a second position within the message thread, an action performed by the GUI object, a reaction performed by the GUI object in response to movement or an action performed by another GUI object, a timing or duration of an action executed by the GUI object, whether or not an action executed by a GUI object repeats, a style of an animation performed by the GUI object, sounds to be played during a duration of an action executed by the GUI object, and other effects that may be applied by the GUI object. The animation that a GUI object is configured to perform may include any movement or transformation. The GUI object may implement the animation as a series of image frames displayed at a predefined rate. As described further below, the GUI object may execute animation once, repeat the animation from beginning to end, or repeat the animation in a ping-pong manner (i.e., execute the animation from beginning to end and then from end to beginning).

According to some embodiments, the target of an action includes one or more locations within a message thread as identified, for example, by a set of screen coordinates or context coordinates. The dimensions of a screen coordinate system, which may be based on the physical resolution of a display, may differ from the dimensions of a context coordinate system, which may be independent of the physical resolution of a display. For example, in one embodiment, the dimensions of a screen coordinate system are 640×1136 pixels. In this embodiment, a screen coordinate of (55, 80) equates to 55 pixels from the left and 80 pixels from the top of the screen, where the origin pixel is top left. In same embodiment, the dimensions of a message thread are substantially larger (e.g., 1000×3000). In this embodiment, a context coordinate of (100, 345) equates to 100 points from the left and 345 points from the top of the thread, where the origin point is top left.

In some embodiments, targets of actions also include one or more components within the message thread as identified, for example, by a name, memory address, pointer, reference, or tag. Targets of actions may also include one or more components displayed within a user interface implementing the GUI object as identified, for example, by the component type, the component status, the function of the component, the behavior of the component, the author of the component, the name of the component, the color of the component, the relative of absolute location of the component, the minimum size of the component, the maximum size of the component, the current size of the component, and the time component was created. Examples of component types that may be used to identify targets of actions include user names, user icons, backgrounds, other GUI objects, keyboard buttons, and messages (e.g., text messages, image messages, video messages, and sound or voice messages). One example of a component status that may be used to identify a target of an action includes whether the component is in an animated state or is not in an animated state. Another example of a component status that may be used to identify a target of an action includes whether a user that the component represents is online or offline.

Figure 27:
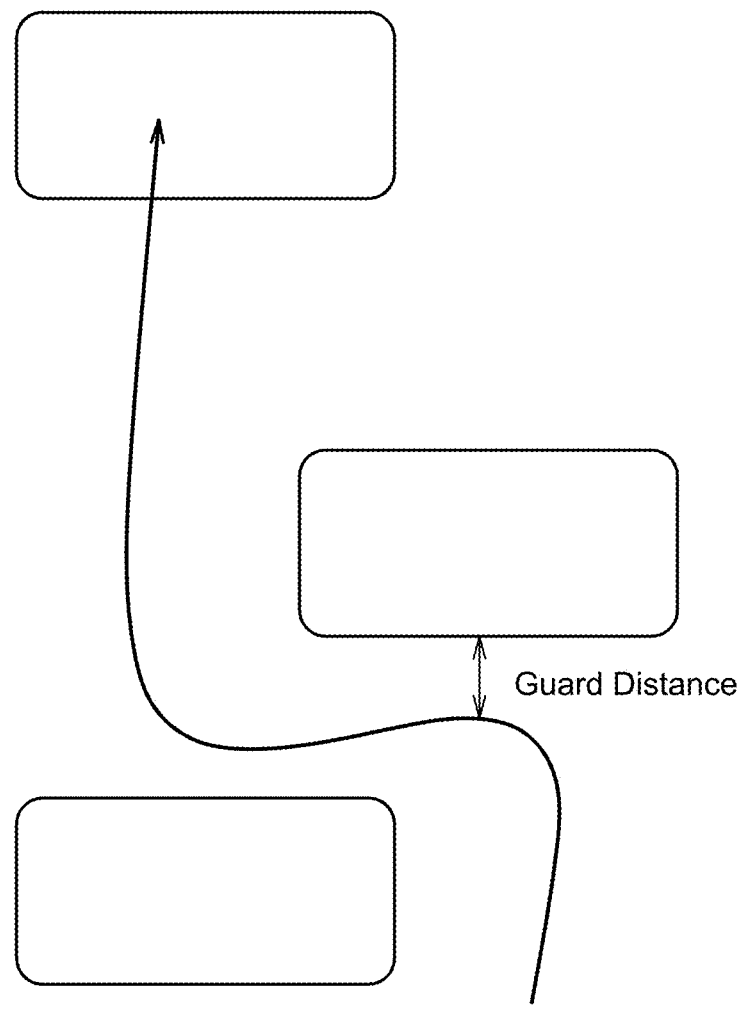
FIG. 27 is a block diagram illustrating movement of a representation of a GUI object relative to other components of a message thread.

In some embodiments, the route of a GUI object includes one or more locations that that a representation of the GUI object is configured traverse to reach the target of the GUI object. The route may be continuous or include a set of discrete points. The route may follow a line, a curve, or be based on guard distances from other components in the message thread (e.g. to avoid collisions) as illustrated in FIG. 27. In various embodiments, the action of a GUI object includes an animation that may or may not be accompanied by other stimulus, such as sound or vibration. The GUI object may perform the animation on its own representation or may perform the animation in conjunction with another component in the message thread, such as a representation of another GUI object. In some embodiments, an action configurable parameter includes a type identifier that is used to group similar actions together. This type identifier may facilitate navigation of large numbers of actions within configuration user interfaces. In other embodiments, if the target is not found within the message thread or is not specified by the target configurable parameter, the GUI object executes the animation against a default target (e.g., the component nearest the representation of the GUI object, a specific location in the message thread, and the like). In at least one embodiment, the action of a GUI object includes interactions with third party systems, such as the third party systems 124 described above with reference to FIG. 1. In this embodiment, the action may include fetching an advertisement from an advertisement server, transmitting sentiment information to a social media website, and initiating a purchase transaction by transmitting information to a financial system. In one embodiment, the action of a GUI object includes music that may be played during a duration in which a GUI object begins an action, a GUI object is on a route to a target, a GUI object reaches a target, or any combination of durations.

In some embodiments, the reaction of a GUI object includes an animation that may or may not be accompanied by other stimulus, such as sound or vibration. In these embodiments, the other stimulus may be activated during a duration in which the GUI object begins an action, is on a route to a target, reaches a target, or any combination of durations. The GUI object may perform the animation on its own representation or may perform the animation in conjunction with another component in the message thread, such as a representation of the GUI object to which the GUI object is reacting. For example, if a first representation of a first GUI object receives a kiss from a second representation of a second GUI object, the second GUI object may react by executing an animation in which the second representation kisses the first representation back. In at least one embodiment, the reaction of a GUI object includes interactions with third party systems, such as the third party systems 124 described above with reference to FIG. 1. In this embodiment, the action may include fetching an advertisement from an advertisement server, and transmitting sentiment information to a social media website.

In some embodiments, a GUI object may have different selectable animations. The different selectable animations may be based on the target object. For example, if a target object is another GUI object, the GUI object may kiss the other GUI object. If the target object is text, the GUI object may eat the text. The animations may be customizable based on user preferences.

In at least one embodiment, a GUI object begins an action including an animation after a user sets up the action. In some examples, the GUI object may receive a click on a GUI object from a menu of GUI objects and display a menu of options. The menu of options may include an action, an action type, timing of an action, effects of an action, and a reaction. The action may include the movement of the GUI object. The GUI object may receive a drag to a target object. The GUI object may alternatively receive a click on a target object and automatically perform the action on the target object. The timing of the action may be used to specify the length of the action and the speed of the action. The effect of an action may include what happens after an action (e.g., red lips on the target object at the end of a kiss action or a bomb exploding and making the screen of the phones of message participants look broken for a few seconds).

In another embodiment, a GUI object may perform an animation in response to being targeted by another GUI object. In these embodiments, the animation may be a reaction. For example, a representation of a first GUI object may be targeted by a representation of a second GUI object and the representation of the first GUI object may execute an animation in which the representation of the first GUI object moves off the screen before the representation of the second GUI object reaches the representation of the first GUI object.

A reaction to an action may include an action the GUI object may take if it is chosen as the target object of another GUI object. For example, a message or GUI object may include a reaction effect to create a representation of a bubble around the message or GUI object when the message or GUI object is chosen as a target for a representation of a bomb. In response to the message or GUI object being targeted by the representation of a bomb, the message or GUI object may be covered by a representation of a bubble and the representation of the bubble may animate to deflect the bomb. The reaction may be specified by a user. Reactions may not be limited to certain actions. For example, the representation of the bubble may not be limited as a reaction to a bomb. If an action was a kiss, the representation of the bubble may, for example, receive the kiss and pop.

According to various embodiments, the timing of a GUI object indicates a duration of an action (e.g., an animation) or a delay before an action (transmitting information to a third party system) is taken. In some embodiments, the number of repeats of a GUI object indicates a number of repetitions of an action to be executed by the GUI object. Where the action is an animation, the number of repeats configurable parameter may include a repetition type identifier. Where the repetition type identifier is set to a normal value, each repetition of the animation executes a normal start to finish. Where the repetition type identifier is set to a ping-pong value, each repetition of the animation executes in reverse from the previous repetition.

Figure 29:
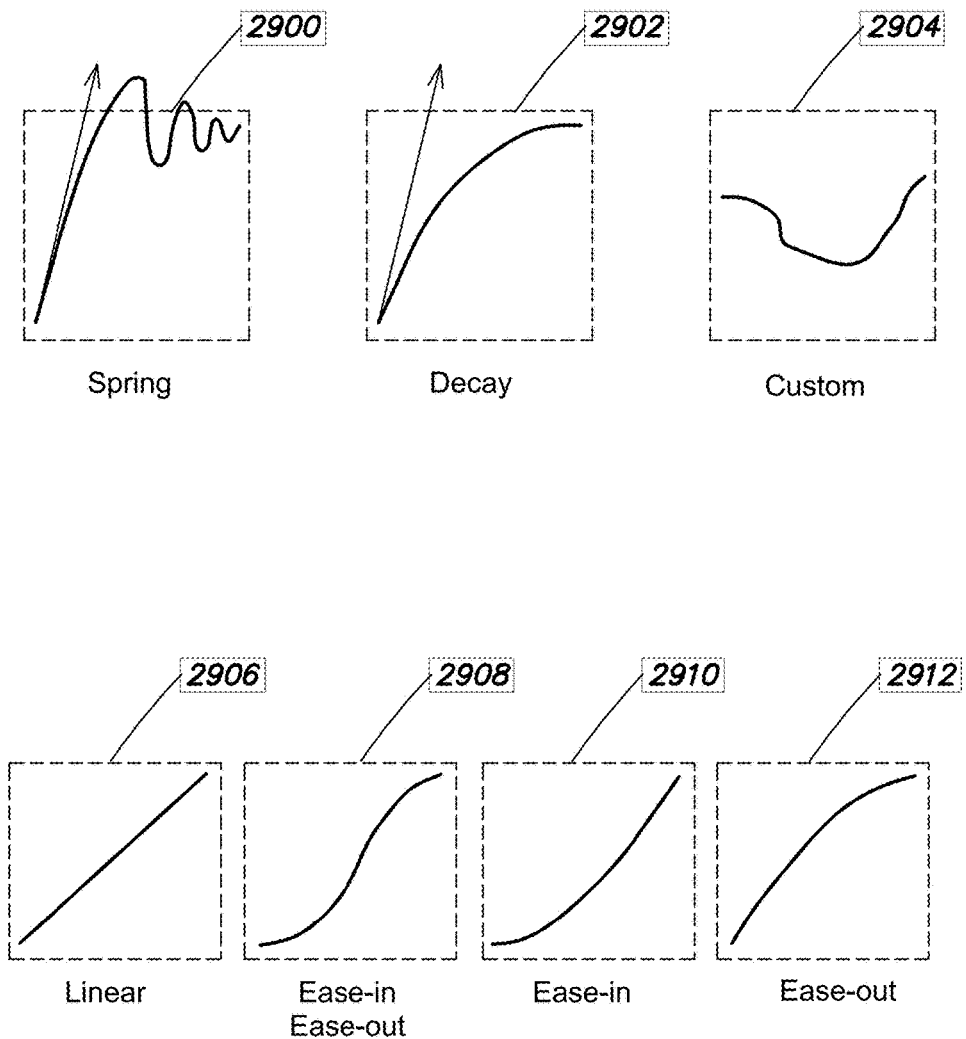
FIG. 29 includes several graphs that illustrate a variety of animation styles.

In some embodiments, the animation style of a GUI object indicates one or more variations in the displayed rate of change within the animation. FIG. 29 illustrates several animation styles in the form of graphs. In each of the graphs presented in FIG. 29, the slope of the curve presented in each graph represents the displayed rate of change within an animation at an elapsed time represented by the horizontal axis. Examples of the animation styles include linear, ease-in (e.g., slow starting), ease-out (e.g., slow ending), ease-in-and-out, decay (fast starting), spring (fast starting followed by oscillation) and custom (e.g., a set of frame speeds specified by the user). A linear animation style is illustrated by the graph 2906. An ease-in animation style is illustrated by the graph 2910. An ease-out animation style is illustrated by the graph 2912. An ease-in-and-out animation style is illustrated by the graph 2908. A decay animation style is illustrated by the graph 2902. A spring animation style is illustrated by the graph 2900. A custom animation style is illustrated by the graph 2904. A linear animation style causes activity displayed within an animation to occur evenly (e.g., full speed) over its duration. An ease-in animation style causes the animation to begin slowly (e.g., half speed), and then speed up as it progresses (e.g., full speed). An ease-out animation style causes the animation to begin quickly (e.g., full speed) and then slow down (e.g., half speed) near completion. An ease-in ease-out animation style causes the animation to begin slowly (e.g., half speed), accelerate (e.g., full speed) through the middle of its duration, and then slow again (e.g., half speed) before completing. A spring animation style causes the animation to begin rapidly (e.g., faster than normal full speed) and then oscillate in an attenuating waveform. A decay animation style causes the animation to begin rapidly and then slow before completing. Under a custom animation style, the animation's displayed rate of change adjusts according to a set of user specified values.

In some embodiments, GUI objects implement a key frame animation style in which the user specifies two or more key frames and the GUI object automatically interpolates one or more intermediate frames according to an interpolation method and displays all frames according to one of the other animation styles described above.

According to various embodiments, the target of an action by a GUI object may include a section of the user interface. Targeted sections of the user interface may include, for example, a user name, a background of a chat, a keyboard of a user, media sent in the chat, messages in the chat, and the user interface as a whole. For example, a representation of a GUI object may drop a bowling ball and display a cracked screen. In another example, a GUI object action may include switching two messages in a chat.

According to one embodiment, GUI objects may interact with elements outside of a chat. For example, a user may receive a GUI object with the words "call me" on it. If the receiving user clicks on the GUI object, the receiving user's device may call the sending user's device. In another embodiment, the GUI object may display a message for a receiving user to confirm or reject a call, and in response to a confirmation, call the sending user. In another example, the GUI object may click on a link sent within the chat. For example, a link to a webpage may be sent followed by a GUI object to click on the link. In this example, the GUI object may cause the receiving device to direct to a page via the link. In another example, the user interface may display a request for permission to navigate to the page in the link.

The GUI object may further be configured to change a background color, theme, or image.

In some examples, a GUI object may be configured to edit a keyboard on a target device's user interface. Also, in another example, GUI object may move to a keyboard and send a message or replace keys on the keyboard.

In some embodiments, GUI objects may be displayed in a locked state until the user interface receives payment from a user to unlock the GUI objects. GUI objects may be associated with prices and sold via, for example, micro transactions within an application. The locked state may be shaded to indicate that the GUI objects are not available. In other embodiments, one or more GUI objects may be unlocked for a limited number of uses before being locked for purchase. An administrator of the messaging application may create new objects with new animations and sell those objects for use in the messaging application.

In at least one embodiment, users of a messaging application may create objects and upload a set of objects for sale to other users. Users of the messaging application may browse through GUI object sets for sale. In some examples, a limited number of GUI objects within the set may be used for free, and other GUI objects may be locked until a user sends a payment to use the other GUI objects. In one embodiment, payment for a set of GUI objects may be sent directly to a user by credit card or Paypal. In some examples, sets of GUI objects may also be sent separately and imported into the messaging application. In these examples, the GUI objects may be bought, for example, from the Google Play Store on an Android device or the App Store on an iOS device.

In some embodiments, other effects that may be applied by a GUI object include application of a transform or a filter to a representation of the GUI object or its target. Examples of transformations include changing the color or color tone of a representation of the GUI object, changing the size of a representation of the GUI object, changing the position of a representation of the GUI object, changing the orientation of a representation of the GUI object, changing the depth of a representation of the GUI object, merging several components with a representation of the GUI objects, and splitting a representation of the GUI objects into multiple components. In some embodiments, a transformation may be implemented using a filter. Additional description of the features that GUI objects are configured to execute is provided below with reference to FIGS. 3-12.

In various embodiments, GUI objects are configured to perform one or more actions or reactions in distinct segments. One example of a segment execution process in accord with these embodiments is described further below with reference to FIG. 13. One example of an action execution process is accord with these embodiments is described further below with reference to FIG. 19. One example of a reaction execution process is accord with these embodiments is described further below with reference to FIG. 20.

In some embodiments, the variable-selection object 128 is configured to be implemented within the user interface 110. The variable-selection object 128 may include, for example, executable code and data structures that, when executed and utilized by at least one processor of the computer system 116, render a graphical representation of the variable-selection object 128 within the user interface 110. The representation of the variable-selection object 128 may include a wide variety of forms, colors, and characteristics. For instance, the representation may include an image, a shape, and descriptive text. Examples of shapes support in some embodiments include circles, rectangles, triangles, ovals, other polygons and user defined shapes. The descriptive text may be located on, below, or next to the representation. In addition, dynamic features of the variable-selection object 128 may alter these forms, colors, and characteristics.

In various embodiments, the dynamic features of a variable-selection object 128 are controlled by values of one or more configurable parameters. These values may be default values or values configured by a user, for example during the process of developing an application that includes the variable-selection object. Examples of the attributes of features that may be controlled by configurable parameters include a shape identifier, a progress indicator identifier, and a selection vector.

In some embodiments, the shape identifier determines the shape and content of the representation of the variable-selection object. The progress identifier determines the animated visual metaphor employed to indicate progress. Examples of these metaphors include a water level, a clock, and a progress bar. Additionally, the progress animation may indicate progress with or without employing a metaphor by changing the size of representation, changing a color of the representation, or changing the position of the representation.

In a variety of embodiments, the selection vector includes a set of name value tuples that define a selection method for each of a series of selection acknowledgements. For example, a first member of the selection vector may indicate that a touch and hold of 1 second is required for a first selection acknowledgement, a touch and hold of 2 seconds is required for a second selection acknowledgement, a touch and hold of 5 seconds is required for a third selection acknowledgement, and a quadruple tap followed by a touch and hold of 20 seconds is required for a fourth selection acknowledgement. In other embodiments, the selection vector is stored as a linear function that directly relates the hold time required for selection acknowledgement to the number of previously acknowledged selections. For example, the linear function may require a touch and hold for 1 second for the first selection acknowledgement, a touch and hold for 2 seconds for the second selection acknowledgement, a touch and hold for 10 seconds for the tenth selection acknowledgement, and so on. In other embodiments, the selection vector implements a holding period according to an arbitrary mathematical function or set of numbers.

Figure 28:
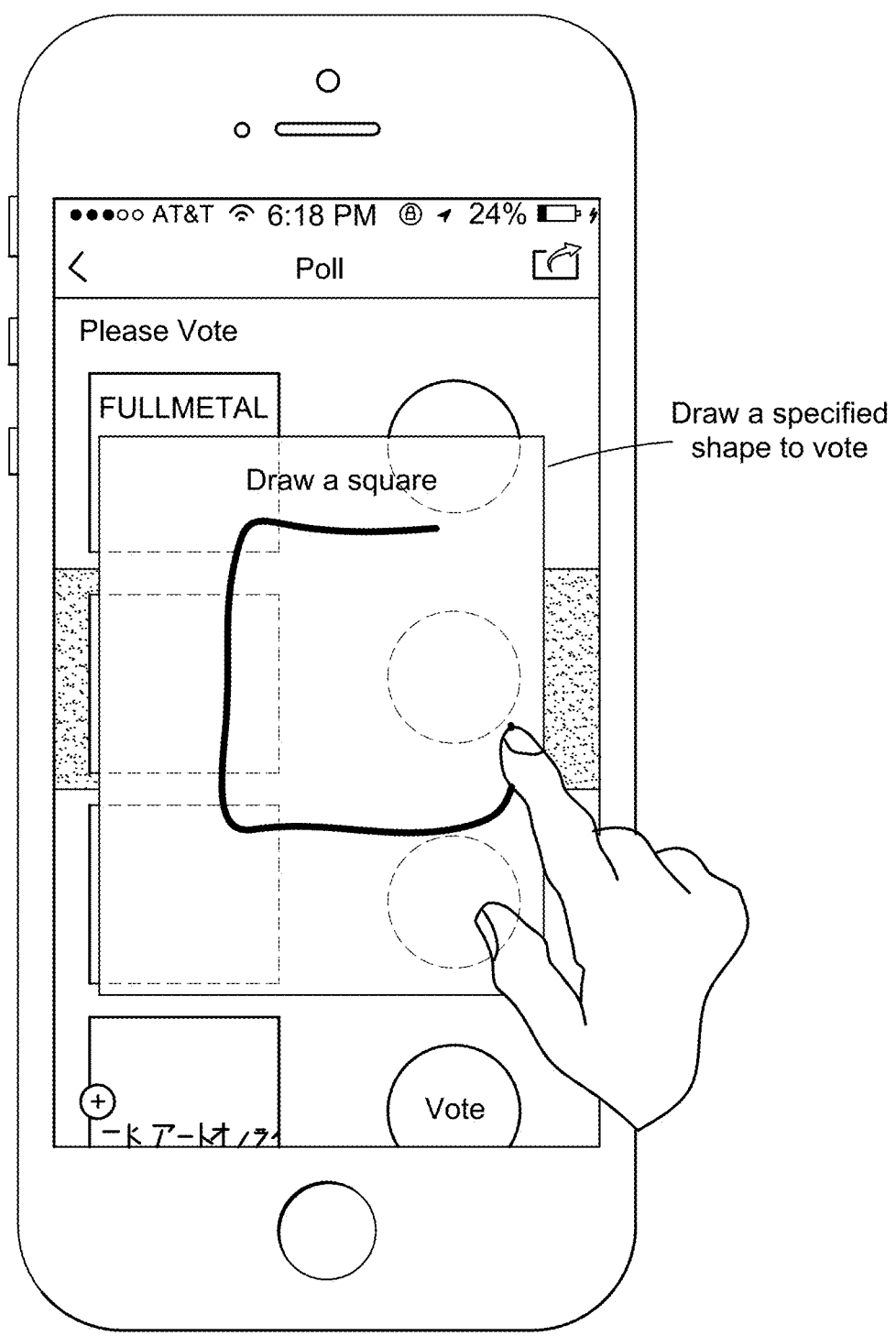
FIG. 28 is an illustration of a gesture required by a selection method of a variable-selection object.

In some embodiments directed toward computer systems including a touch screen, input that may be required by a selection method for any given selection acknowledgement includes a touch down (inside or outside of the vicinity of the representation of a variable-selection object), a touch up (inside or outside of the vicinity of the representation of a variable-selection object), a touch down repeat, a touch drag (inside or outside of the vicinity of the representation of a variable-selection object), a touch drag through (enter or exit of the vicinity of the representation of a variable-selection object), and a touch cancel (due to interruption such as view disappearing or an incoming call). Alternatively or additionally, variable-selection objects may implement selection methods that require input including drawing or tracing one or more shapes (e.g., polygons, letters, irregular shapes, etc.). In some embodiments, the variable-selection objects are configured to increase the difficulty level of the shapes as a user continues to receive selection acknowledgements. The difficulty level of the shapes may be increased by requiring more instances of a shape (e.g., 2 squares, 3 squares, etc.) or more complex shapes a star, a smiley face, or the like. One example where the selection method requires a square is illustrated in FIG. 28. According to some embodiments, a variable-selection object may define a vicinity that is larger or smaller than the visible boundary of its representation. This allows the variable-selection object to adjust error tolerance for a better user interaction experience. For example, the user's finger may inaccurately tap outside of the actually representation boundary, but the variable-selection object may still recognize the event as a tap inside the representation where the tap occurs inside a predefined vicinity (e.g., 10 pixels) of a border of the representation. In these embodiments, the vicinity is a configurable parameter.

In some embodiments a graphical representation of a variable-selection object 128 may change color based on how many selection attempts are made by a user. For example, the graphical representation of the variable-selection object may begin in dark blue at 0 votes, change to light blue at 10 votes, change to yellow at 25 votes, and change to red at 50 votes. The colors of the graphical representations may be configured to change into different colors based on users and voting topics. Notably, the color may be used as an indicator of how strong a vote signal relating to an object is.

In various embodiments, a selection vector may alter the manner in which a variable-selection object acknowledges selections based on a variety of additional factors. For example, in some embodiments, a selection vector is configured to alter one or more selection methods used by a variable-selection object based on a number of selections made by all users of an application, based on a number of selections made by a particular user, or based on a time interval between previous selections made by a particular user. For instance, the selection vector may be based on a linear function that relates the number of previous users who have made an acknowledged selection to a required hold duration for the next selection acknowledgement. In this example, the selection vector may specify that a first user must touch and hold the variable-selection object for a duration 1 second to receive a selection acknowledgement, that a second user must touch and hold for a duration of 2 seconds to receive a selection acknowledgement, that a tenth user must touch and hold for a duration of 10 seconds to receive a selection acknowledgement, and so on. In another example, the selection vector encodes a sequence of numbers that are a product of trial and error analysis conducted by an interface designer. In this example, the selection vector may specify a series of arbitrary durations for acknowledgement of sequential touch and holds.

In another example, a selection vector is configured to alter the time required for a variable-selection object to acknowledge one or more selections based on a number of prior selections made by a user. In this example, the selection vector specifies that a first selection attempt (e.g. a touch and hold) by the user must have a duration of 0.5 seconds to receive a selection acknowledgment by the variable-selection object. Continuing this example, the selection vector also specifies that a second attempt by the user must have a duration of 1 second to receive a selection acknowledgment. Also, according to this example, the selection vector specifies that a tenth selection attempt by the user must have a duration of 5 seconds to receive a selection acknowledgment. Thus, according to this example, the more selections previously made by a user, the longer the time required make subsequent selections.

In another example, a selection vector is configured to alter the time required for a variable-selection object to acknowledge one or more selections based on a time interval between previous selections made by a particular user. In this example, the selection vector specifies that a first selection attempt (e.g., a touch and hold) by the user must have a duration of 0.5 seconds to receive a selection acknowledgment by the variable-selection object. Continuing this example, the selection vector also specifies that where the time elapsed from a previous selection to a selection attempt is less than 1 minute, the selection attempt must have a duration of 20 seconds to receive a selection acknowledgement. Also, according to this example, the selection vector specifies that where the time elapsed from a previous selection to a selection attempt is greater than 1 minute but less than 5 minutes, the selection attempt must have a duration of 10 seconds to receive a selection acknowledgement. Moreover, according to this example, the selection vector specifies that where the time elapsed from a previous selection to a selection attempt is greater than 5 minute but less than 10 minutes, the selection attempt must have a duration of 5 seconds to receive a selection acknowledgement. Finally, according to this example, the selection vector specifies that where the time elapsed from a previous selection to a selection attempt is greater than 10 minutes, the selection attempt must have a duration of 1 second to receive a selection acknowledgement. Thus, according to this example, the more recent a previous selection made by a user, the longer the time required make subsequent selections.

In another example, the selection vector may be based on a linear function that relates the time interval lapsed since the most recent acknowledged selection by a user to a required hold duration for the next selection acknowledgement. In this example, the selection vector may specify that a user touch and hold the variable-selection object for a duration 10 seconds to receive a selection acknowledgement if the user's previous selection acknowledgement occurred within the last minute, that the user touch and hold for a duration of 9 seconds if the previous selection acknowledgement occurred between one and two minutes in the past, and so on. Additional description of the features that variable-selection objects are configured to execute is provided below with reference to FIGS. 14-17. In various embodiments, variable-selection objects are configured to perform one or more selection processes. One example of a selection process in accord with these embodiments is described further below with reference to FIG. 18.

In some embodiments, the poll objects 132 and 134 are configured to be implemented within the user interfaces 108 and 112. The poll objects 132 and 134 may include, for example, executable code and data structures that, when executed and utilized by at least one processor of the computer systems 114 and 118, render graphical representations of the poll objects 132 and 134 within the user interfaces 108 and 112. One example of a message data structured generated by the poll objects 132 and 134 is described further below with reference to FIG. 26. A user, such as the user 102 or the user 106, may interact with these representations and may activate them as discussed further below. The representations of the poll objects 132 and 134 may include a wide variety of forms, colors, and characteristics.

Figure 26:
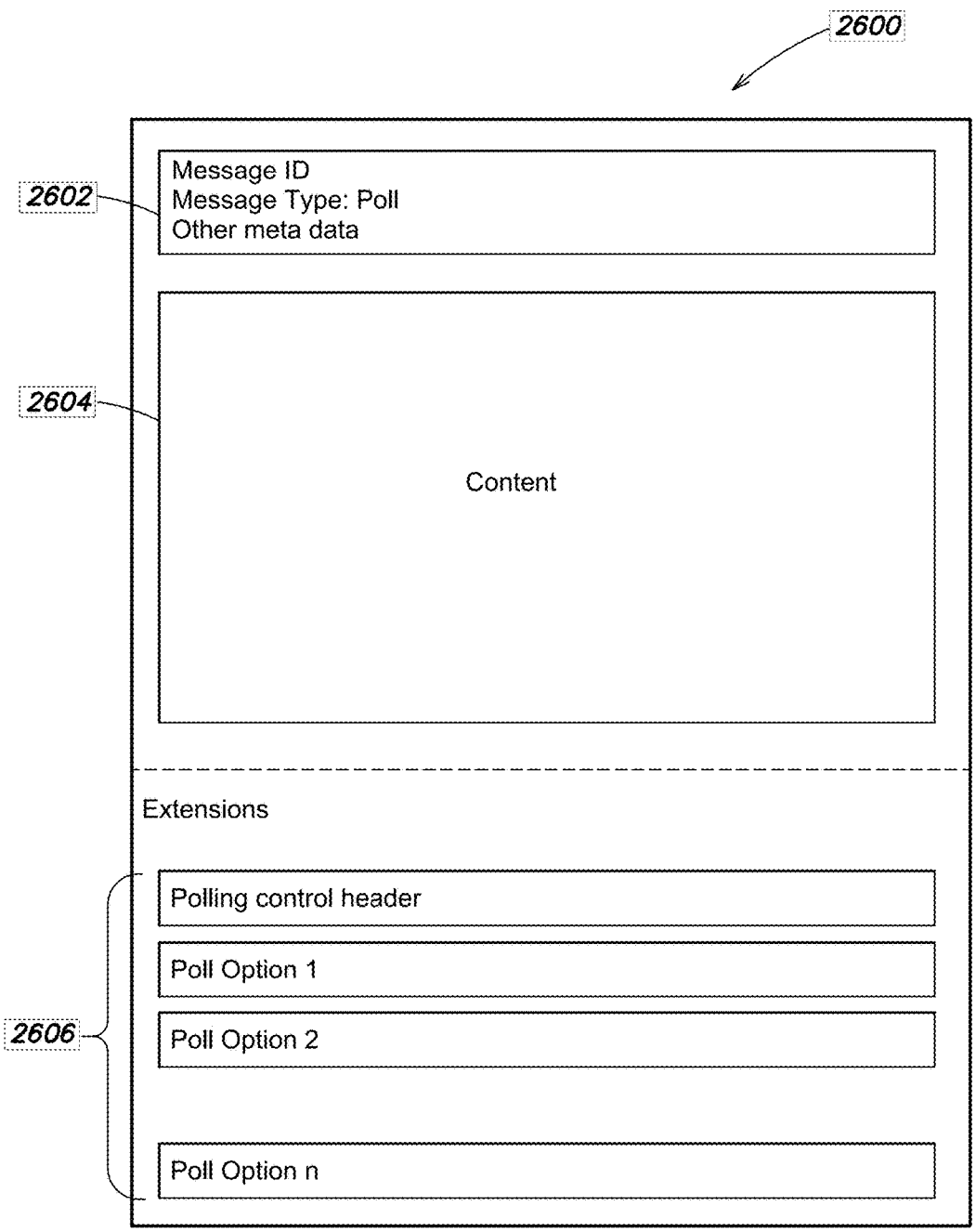
FIG. 26 is a block diagram of a data structure of a poll object.

In some embodiments, the poll objects 132 and 134 are configured to generate messages that conform to a message data structure 2600 illustrated in FIG. 26. As shown in FIG. 26, the message data structure 2600 includes a variety of configurable parameters: a message header 2602, message content 2604, and polling extensions 2606. The message header 2602 includes a message identifier, a message type identifier and additional metadata descriptive of the message. In embodiments in accord with FIG. 26, the message type identifier stores a value of "Poll" so that the user interfaces 108 and 112 will properly render a representation of a poll object within a message thread in response to receiving the message data structure 2600. Also in these embodiments, the message content 2604 stores text or other content to be displayed within the representation of the poll object.

According to at least one embodiment, a poll object 134 may be a variable-selection object 128. In these embodiments, the poll object 134 may include a selection vector configured to alter the time required for the poll object 134 to acknowledge one or more selections based on a number of prior selections made by a user. The number of selections made for each poll object 134 may be displayed next to a representation of the poll object as well as representations of the users who selected the poll object 134.

According to some embodiments illustrated by FIG. 26, the polling extensions 2606 include a polling control header and one or more polling options. In these embodiments, the polling control header stores values that specify the operation of the representation of a poll object. Examples of the operations controllable via these values include whether to allow other users to add the poll options, whether to allow users to change a previous selection to a new selection, the expiration date of the poll object, whether the representation of the poll shows poll results to a user before receiving input indicating a preference of the user, the user interface layout scheme of the representation of the poll object, and whether the representation of the poll object displays user identifiers or maintains anonymity. In some embodiments, the one or more polling options store values that specify information related to each possible poll option available for selection. This information may include a title of the option, an image to represent or be displayed in conjunction with the option, video to represent or be displayed in conjunction with the option, sound to represent or be provided in conjunction with the option or selection of the option, music to represent or be displayed in conjunction with the option or selection of the option, a link to represent or be displayed in conjunction with the option, etc. The information related to each possible poll options may also include a count of the number of times the option has been selected and identifiers of the users who selected the option. Additional description of the features that poll objects are configured to execute is provided below with reference to FIGS. 21-24.

In various embodiments, poll objects are configured to perform one or more polling processes. One example of a polling process in accord with these embodiments is described further below with reference to FIG. 25.

Information may flow between the components illustrated in FIG. 1, or any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models include iPhones, iPads, and iPod touches running iOS operating system available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 2:
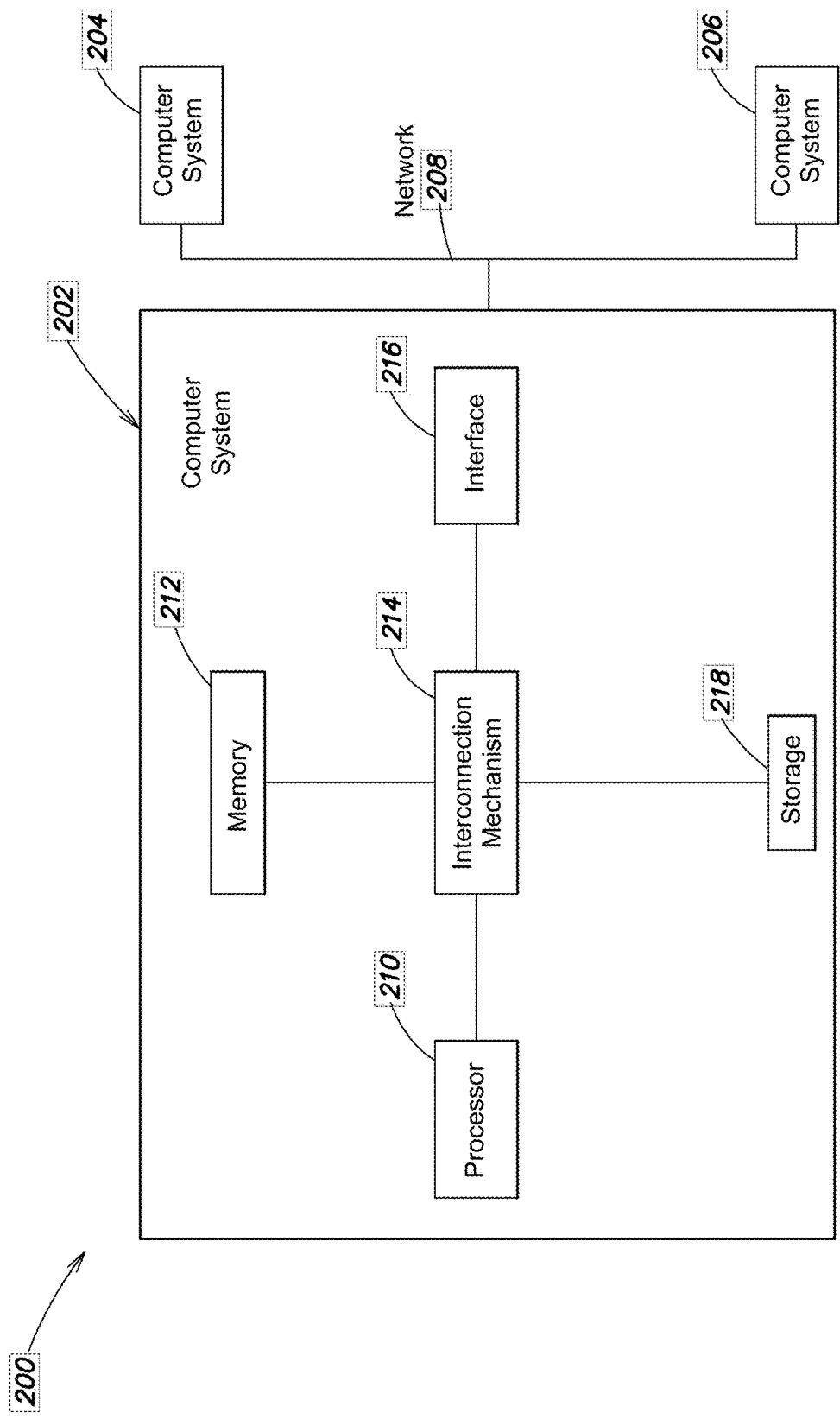
FIG. 2 is a schematic diagram of a computer system.

Referring to FIG. 2, there is illustrated a block diagram of a distributed computer system 200, in which various aspects and functions are practiced. As shown, the distributed computer system 200 includes one or more computer systems that exchange information. More specifically, the distributed computer system 200 includes computer systems 202, 204, and 206. As shown, the computer systems 202, 204, and 206 are interconnected by, and may exchange data through, a communication network 208. The network 208 may include any communication network through which computer systems may exchange data. To exchange data using the network 208, the computer systems 202, 204, and 206 and the network 208 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 202, 204, and 206 may transmit data via the network 208 using a variety of security measures including, for example, SSL or VPN technologies. While the distributed computer system 200 illustrates three networked computer systems, the distributed computer system 200 is not so limited and may include any number of computer systems and computing devices, networked using any medium and communication protocol.

As illustrated in FIG. 2, the computer system 202 includes a processor 210, a memory 212, an interconnection element 214, an interface 216 and data storage element 218. To implement at least some of the aspects, functions, and processes disclosed herein, the processor 210 performs a series of instructions that result in manipulated data. The processor 210 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 210 is connected to other system components, including one or more memory devices 212, by the interconnection element 214.

The memory 212 stores programs (e.g., sequences of instructions coded to be executable by the processor 210) and data during operation of the computer system 202. Thus, the memory 212 may be a relatively high performance, volatile, random access memory such as a dynamic random access memory ("DRAM") or static memory ("SRAM"). However, the memory 212 may include any device for storing data, such as a disk drive or other nonvolatile storage device. Various examples may organize the memory 212 into particularized and, in some cases, unique structures to perform the functions disclosed herein. These data structures may be sized and organized to store values for particular data and types of data.

Components of the computer system 202 are coupled by an interconnection element such as the interconnection element 214. The interconnection element 214 may include any communication coupling between system components such as one or more physical busses in conformance with specialized or standard computing bus technologies such as IDE, SCSI, PCI and InfiniBand. The interconnection element 214 enables communications, including instructions and data, to be exchanged between system components of the computer system 202.

The computer system 202 also includes one or more interface devices 216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 202 to exchange information and to communicate with external entities, such as users and other systems.

The data storage element 218 includes a computer readable and writeable nonvolatile, or non-transitory, data storage medium in which instructions are stored that define a program or other object that is executed by the processor 210. The data storage element 218 also may include information that is recorded, on or in, the medium, and that is processed by the processor 210 during execution of the program. More specifically, the information may be stored in one or more data structures specifically configured to conserve storage space or increase data exchange performance. The instructions may be persistently stored as encoded signals, and the instructions may cause the processor 210 to perform any of the functions described herein. The medium may, for example, be optical disk, magnetic disk or flash memory, among others. In operation, the processor 210 or some other controller causes data to be read from the nonvolatile recording medium into another memory, such as the memory 212, that allows for faster access to the information by the processor 210 than does the storage medium included in the data storage element 218. The memory may be located in the data storage element 218 or in the memory 212, however, the processor 210 manipulates the data within the memory, and then copies the data to the storage medium associated with the data storage element 218 after processing is completed. A variety of components may manage data movement between the storage medium and other memory elements and examples are not limited to particular data management components. Further, examples are not limited to a particular memory system or data storage system.

Although the computer system 202 is shown by way of example as one type of computer system upon which various aspects and functions may be practiced, aspects and functions are not limited to being implemented on the computer system 202 as shown in FIG. 2. Various aspects and functions may be practiced on one or more computers having a different architectures or components than that shown in FIG. 2. For instance, the computer system 202 may include specially programmed, special-purpose hardware, such as an application-specific integrated circuit ("ASIC") tailored to perform a particular operation disclosed herein. While another example may perform the same operation using a grid of several general-purpose computing devices running MAC OS System X with Intel processors and several specialized computing devices running proprietary hardware and operating systems.

The computer system 202 may be a computer system including an operating system that manages at least a portion of the hardware elements included in the computer system 202. In some examples, a processor or controller, such as the processor 210, executes an operating system. Examples of a particular operating system that may be executed include a Windows-based operating system, such as, Windows NT, Windows 2000 (Windows ME), Windows XP, Windows Vista, Windows Phone, or Windows 7 operating systems, available from the Microsoft Corporation, Android operating system available from Google, Blackberry operating system available from Blackberry Limited, a MAC OS System X operating system or an iOS operating system available from Apple, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Ruby, Objective-C, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Runtime Object User Interfaces

Figure 3:
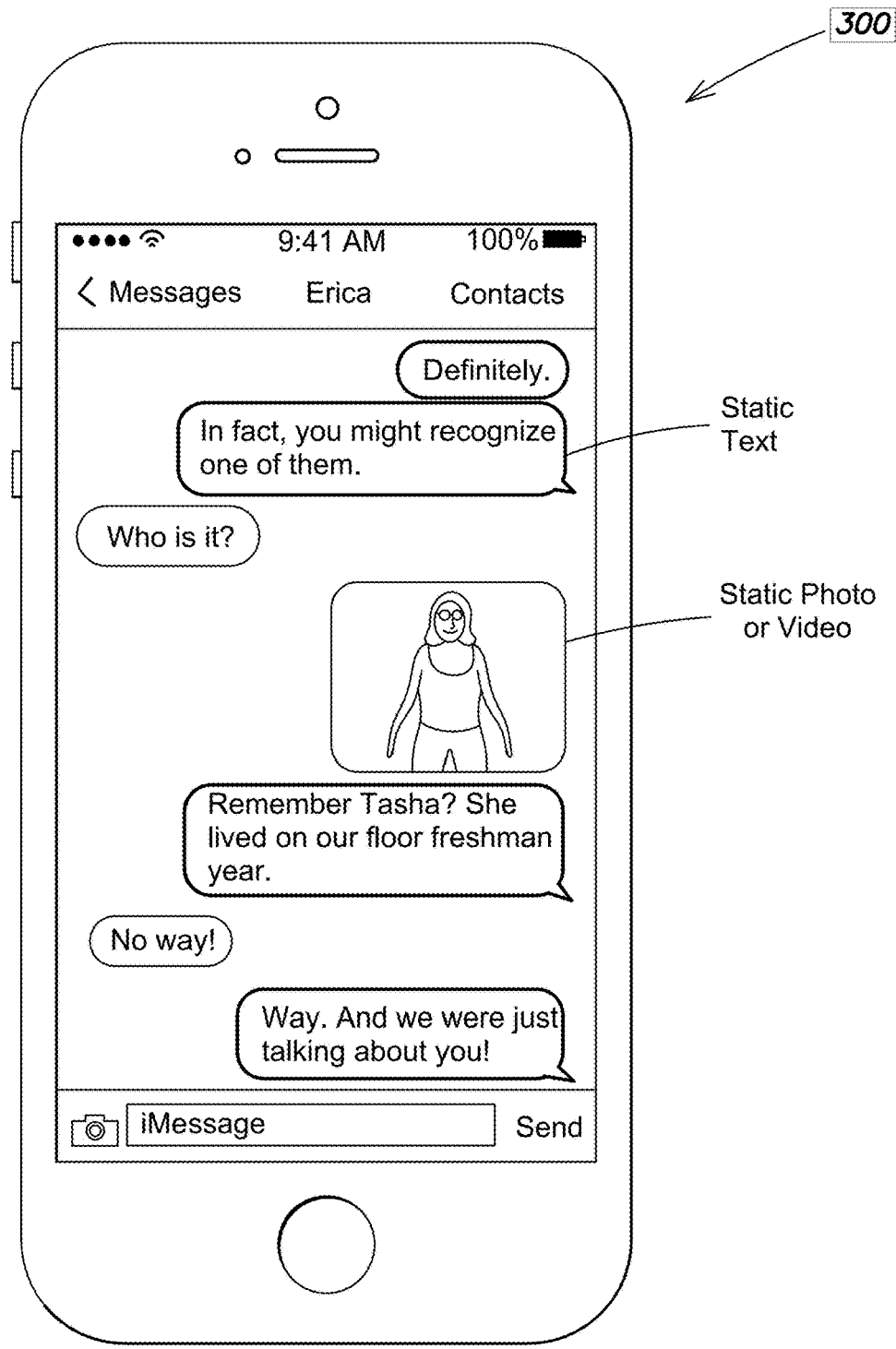
FIG. 3 is an illustration of a screen provided by a text message application.
Figure 4:
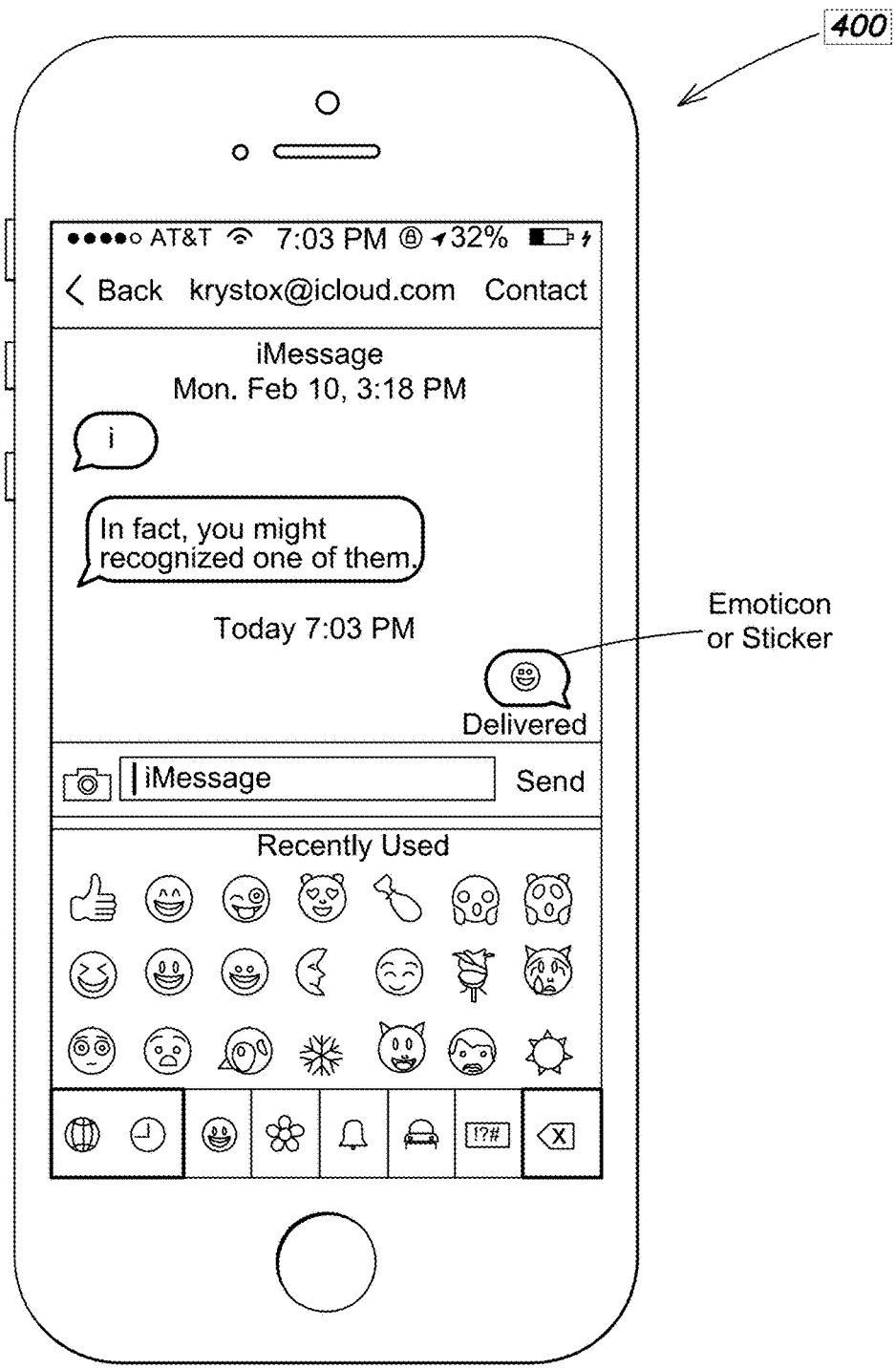
FIG. 4 is an illustration of another screen provided by a text message application.
Figure 5:
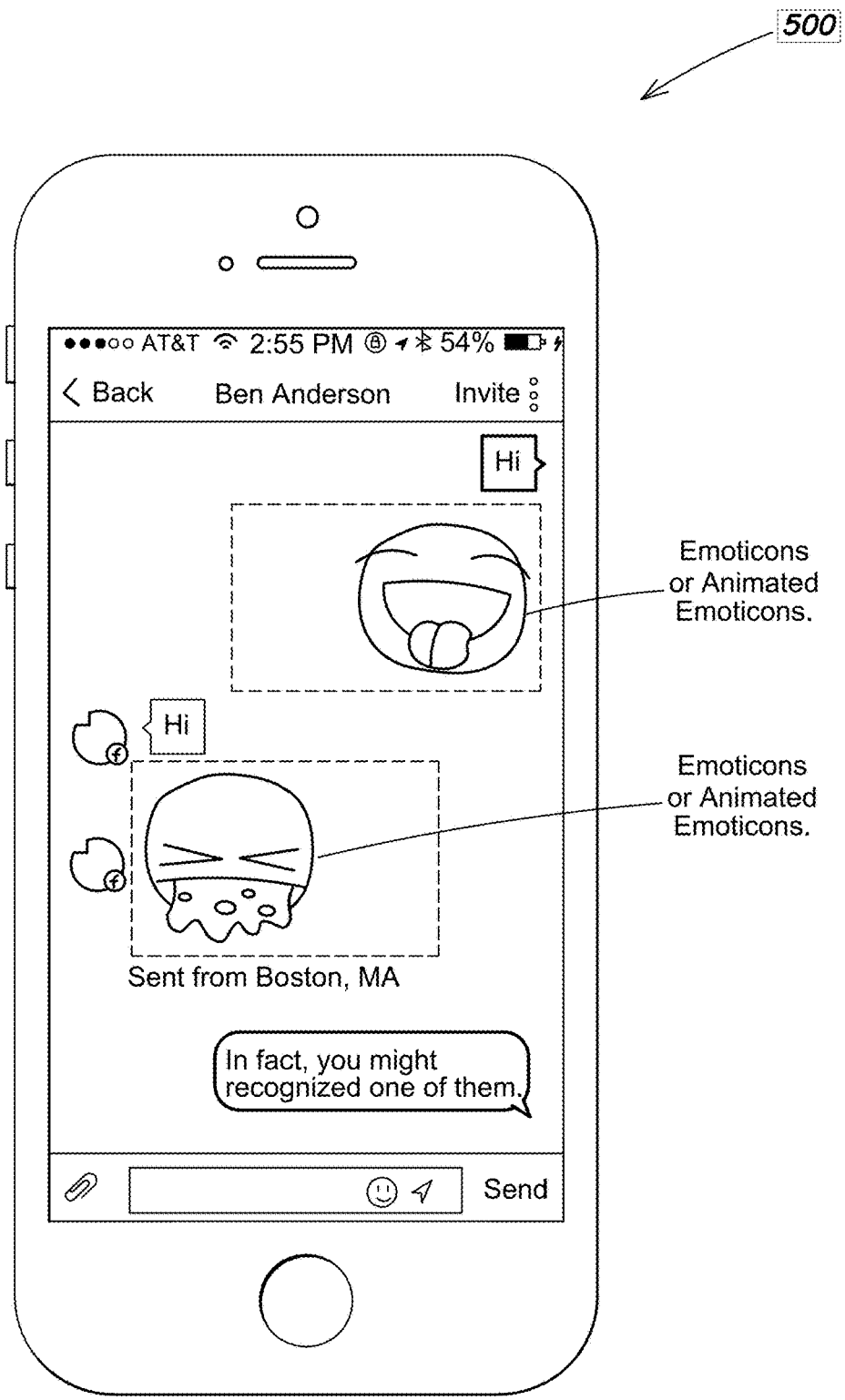
FIG. 5 is an illustration of another screen provided by a text message application.

FIGS. 7-12, 14-17, and 21-24 illustrate example interface screens including representations of GUI objects, variable-selection objects, and poll objects provided according to various embodiments. It is appreciated that other interface elements may be provided, and embodiments described herein are not limited to a particular interface element, object, screen, or set of screens. FIG. 3 illustrates a mobile computing device 300 providing by a user interface, such as the user interface 108 describe above with reference to FIG. 1. As shown in FIG. 3, the user interface displays a message thread that includes static text and a static photo or video. In FIG. 4, a user interface provided by a mobile computing device 400 displays static text and a static emoticon or sticker within the message thread. In FIG. 5, a user interface provided by a mobile computing device 500 displays emoticons or animated emoticons within the message thread. The appearance of animated emoticons changes overtime. However, a user may not specify attributes of the animation sequence and the animated emoticons may not move beyond their content frames within the message thread. In addition, the animated emoticons are unaware of other components within the message thread, and therefore do not interact with the other components.

Figure 6:
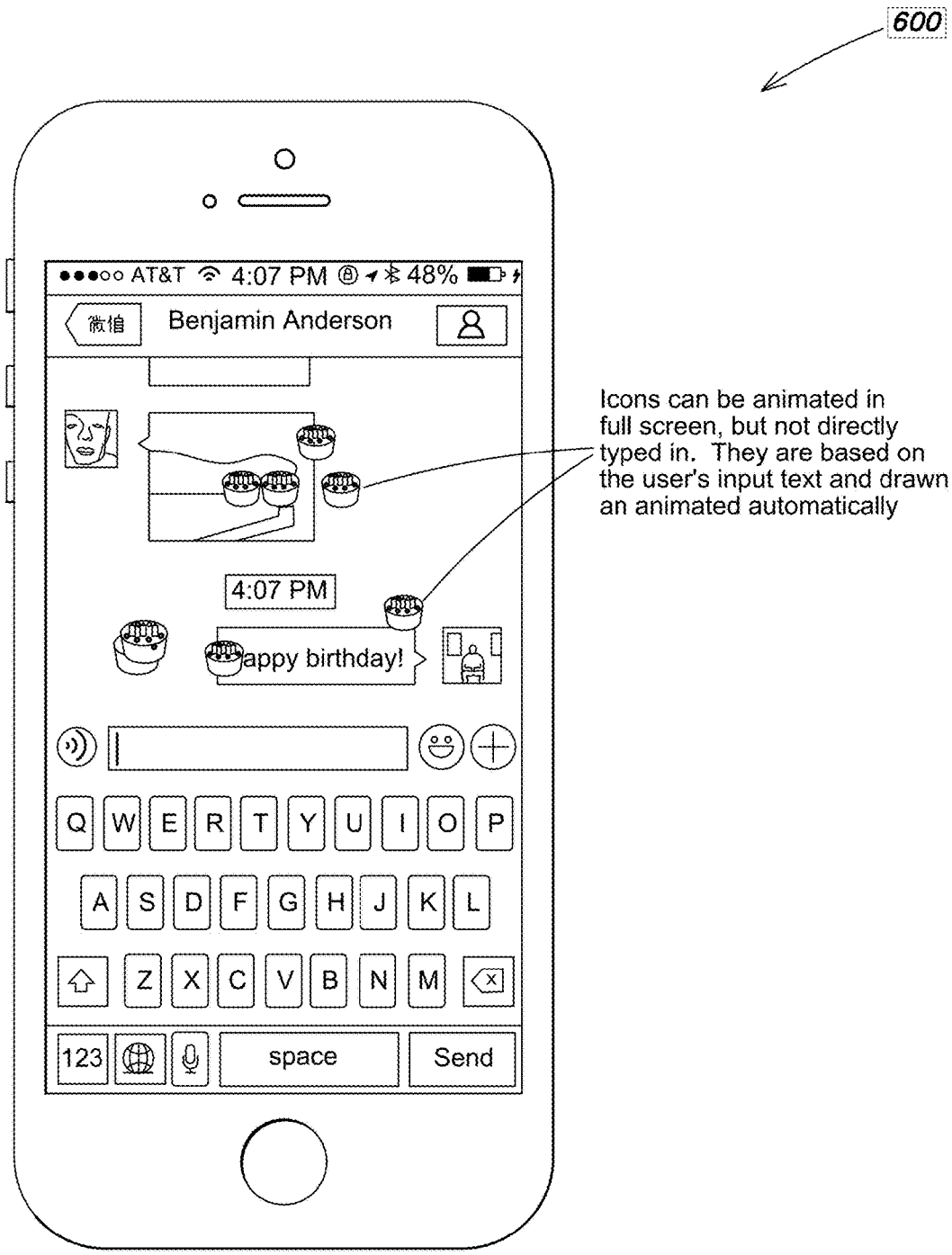
FIG. 6 is an illustration of another screen provided by a text message application.

In FIG. 6, a user interface provided by a mobile computing device 600 displays icons that move along the displayed portion of a message thread. As illustrated in FIG. 6, the user interface is configured to display the moving icons, which mimic birthday cakes, in response to receiving an input string including "happy birthday!" Unfortunately, these moving icons are not user configurable and cannot be activated by the user directly as they are derived from the input string. In addition, these moving icons are unaware of, and do not interact with, other components in the message thread and disappear from the message thread after the animation finishes.

Figure 7:
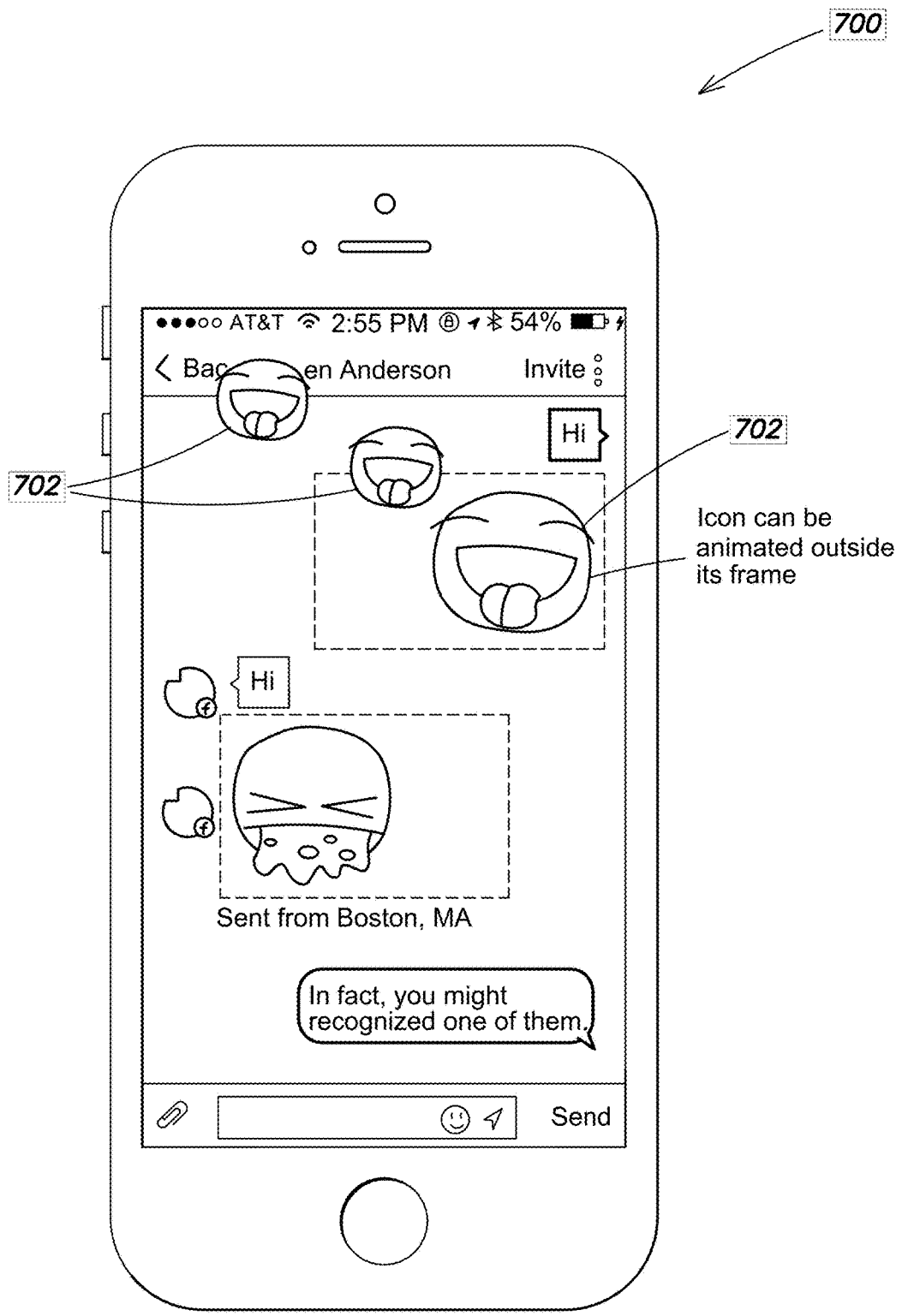
FIG. 7 is an illustration of a message thread including representations of GUI objects provided by an enhanced messaging system.

Some embodiments implement one or more interactive or dynamic GUI objects. These GUI objects may be activated by a user, such as the user 102 described above with reference to FIG. 1. The user may activate a GUI object via a drag and drop operation from an object palette to a message thread or, in some embodiments, by inputting specific text sequences into a user interface, such as the user interface 108 described above with reference to FIG. 1. FIG. 7 illustrates one embodiment in which a user interface provided by a mobile computing device 700 is configured to implement a GUI object presenting a representation 702 within a message thread. As illustrated in FIG. 7, when executing according to this configuration, the representation 702 of the GUI object moves outside of its frame within the message thread. This movement may extend to any portion (e.g., visible or invisible) of the message thread or even beyond the message thread. Further this movement may be displayed on any of the devices engaged in the message thread.

Figure 8:
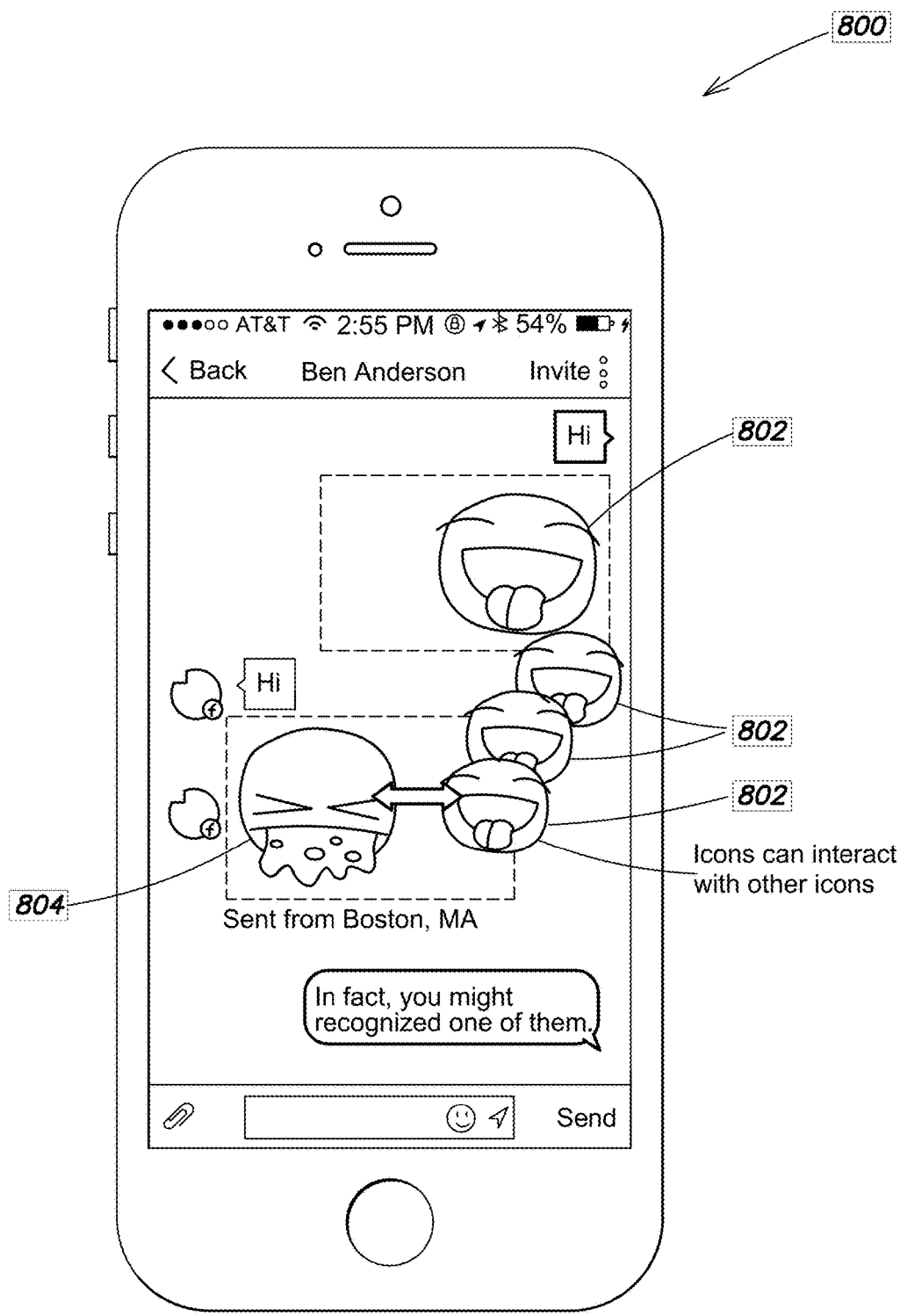
FIG. 8 is another illustration of a message thread including representations of GUI objects provided by the enhanced messaging system.

FIG. 8 illustrates another embodiment in which a user interface provided by a mobile computing device 800 is configured to implement first and second GUI objects respectively presenting representations 802 and 804 within a message thread. As illustrated in FIG. 8, when executing according to this configuration, the representation 802 of the first GUI object moves outside of its frame within the message thread toward a frame of the representation 804 of the second GUI object. Upon the representation 802 of the first GUI object reaching a predefined proximity to the representation 804 the second GUI object, the representation 802 of the first GUI object acts upon the representation 804 of the second GUI object. One example of an action process executed by the first GUI object is described further below with reference to FIG. 19. In response to this action, the representation 804 of the second GUI object may react to the representation 802 of the first GUI object. One example of a reaction process executed by the second GUI object is described further below with reference to FIG. 20. The actions and reactions of the representations 802 and 804 of the first and second GUI objects may be displayed on any of the devices engaged in the message thread.

Figure 9:
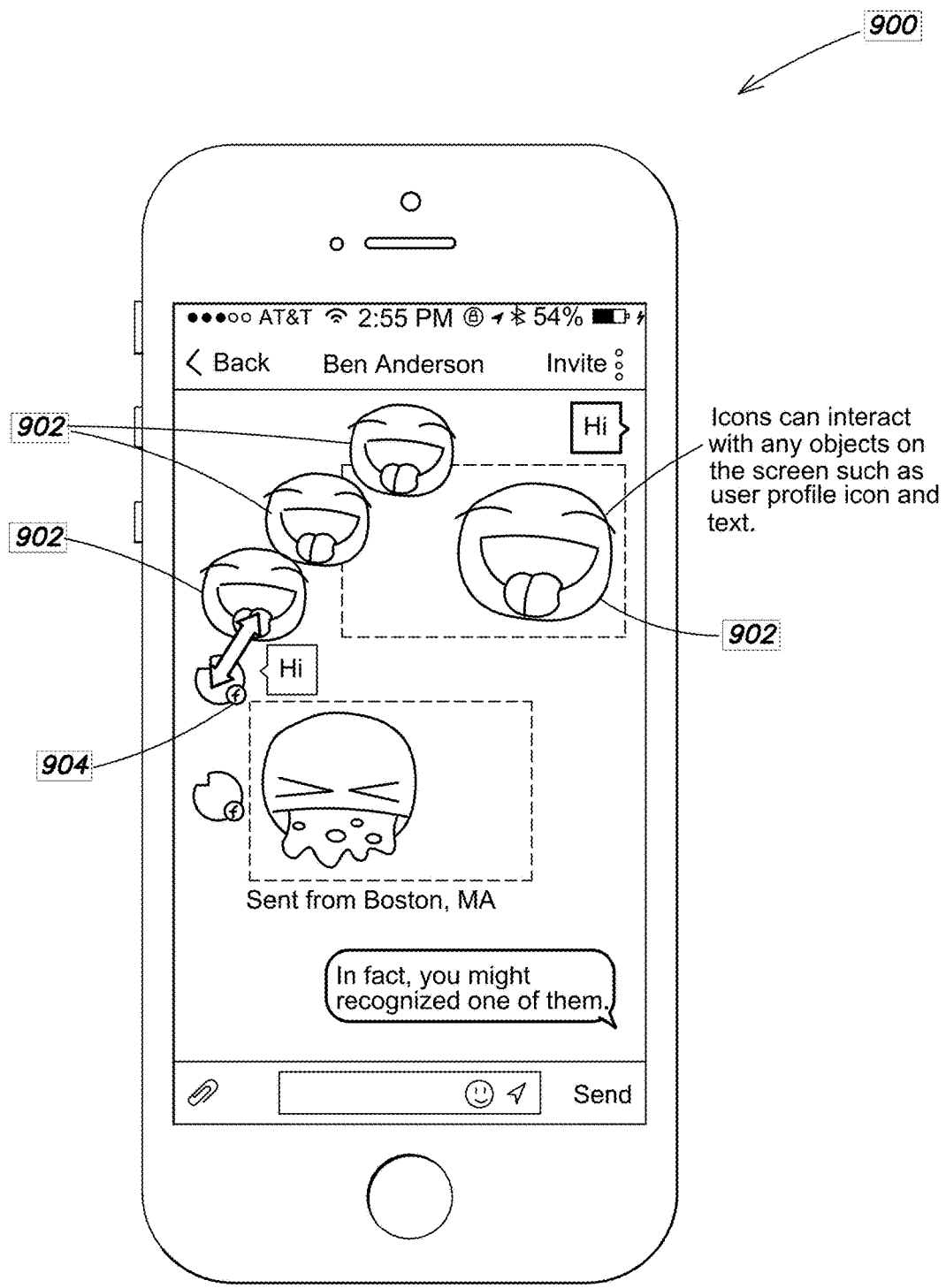
FIG. 9 is another illustration of a message thread including representations of GUI objects provided by the enhanced messaging system.

FIG. 9 illustrates another embodiment in which a user interface provided by a mobile computing device 900 is configured to implement a GUI object presenting a representation 902 within a message thread. As illustrated in FIG. 9, when executing according to this configuration, the representation 902 of the GUI object moves outside of its frame within the message thread toward another component within the message thread (i.e., a user icon 904). Upon the representation 902 of the GUI object reaching a predefined proximity to the user icon 904, the representation 902 of the GUI object acts upon the user icon 904. These actions may be displayed on any of the devices engaged in the message thread.

In some embodiments, the GUI object is configured to cause its representation 902 to act upon other components within the message thread. Examples of these components include emoticons, stickers, user names, background images, message bubbles, text boxes, images, videos, sounds, keyboards, title bars, status bars, edges of the user interface, or any other user interface element.

Figure 10:
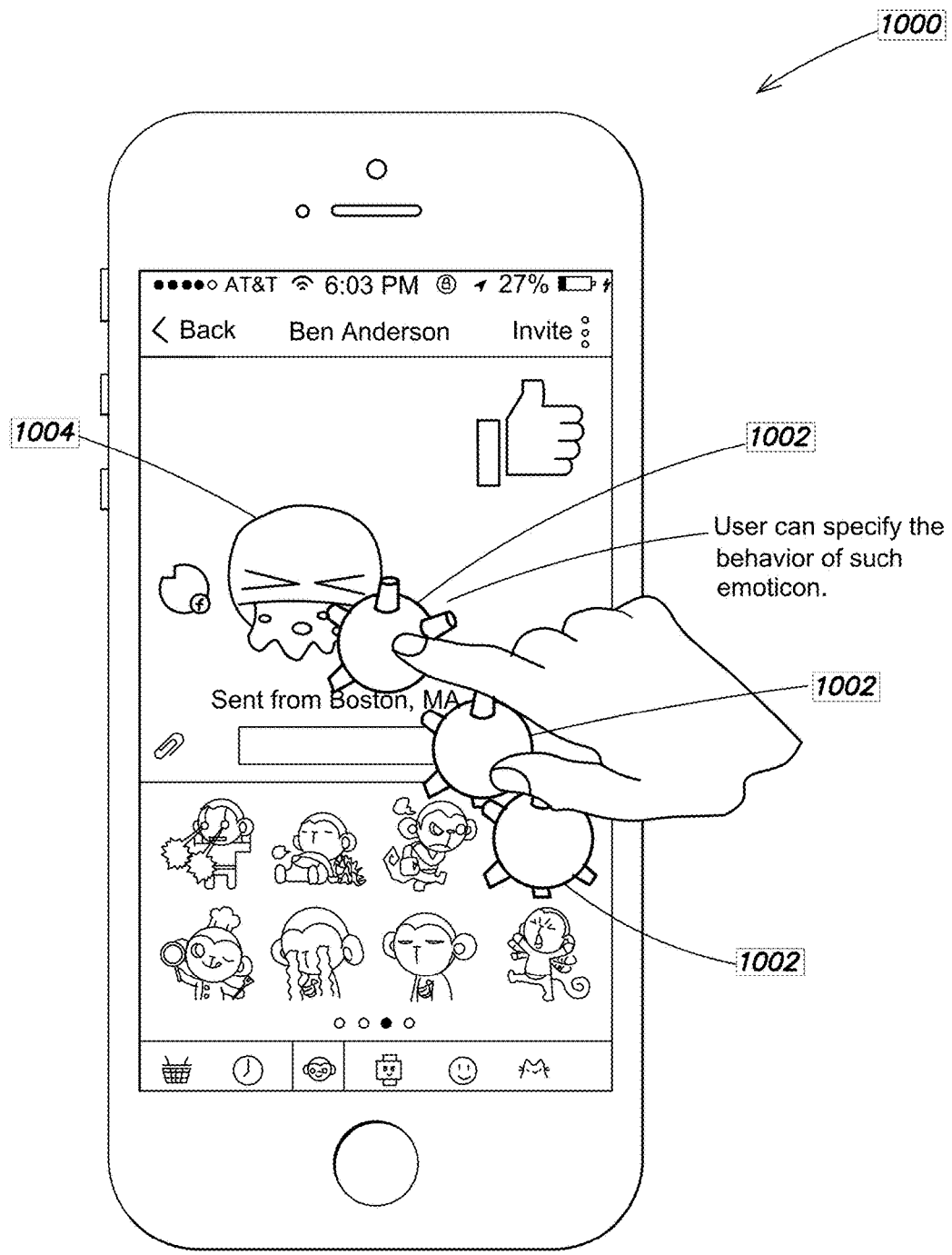
FIG. 10 is an illustration of an interaction between a user and the enhanced messaging system.

FIG. 10 illustrates another embodiment in which a user interface provided by a mobile computing device 1000 is configured to implement first and second GUI objects respectively presenting representations 1002 and 1004 within a message thread. As illustrated in FIG. 10, when executing according to this configuration, the representation 1002 of the first GUI object moves outside of its frame within a GUI object palette toward the representation 1004 of the second GUI object in response to a selection and drag operation by a user. In some embodiments, upon the representation 1002 of the first GUI object reaching a predefined proximity to the representation 1004 of the second GUI object and being dropped by the user (and thus being activated by the user), the first GUI object acts upon the representation 1004 of the second GUI object according to its default values.

Figure 11:
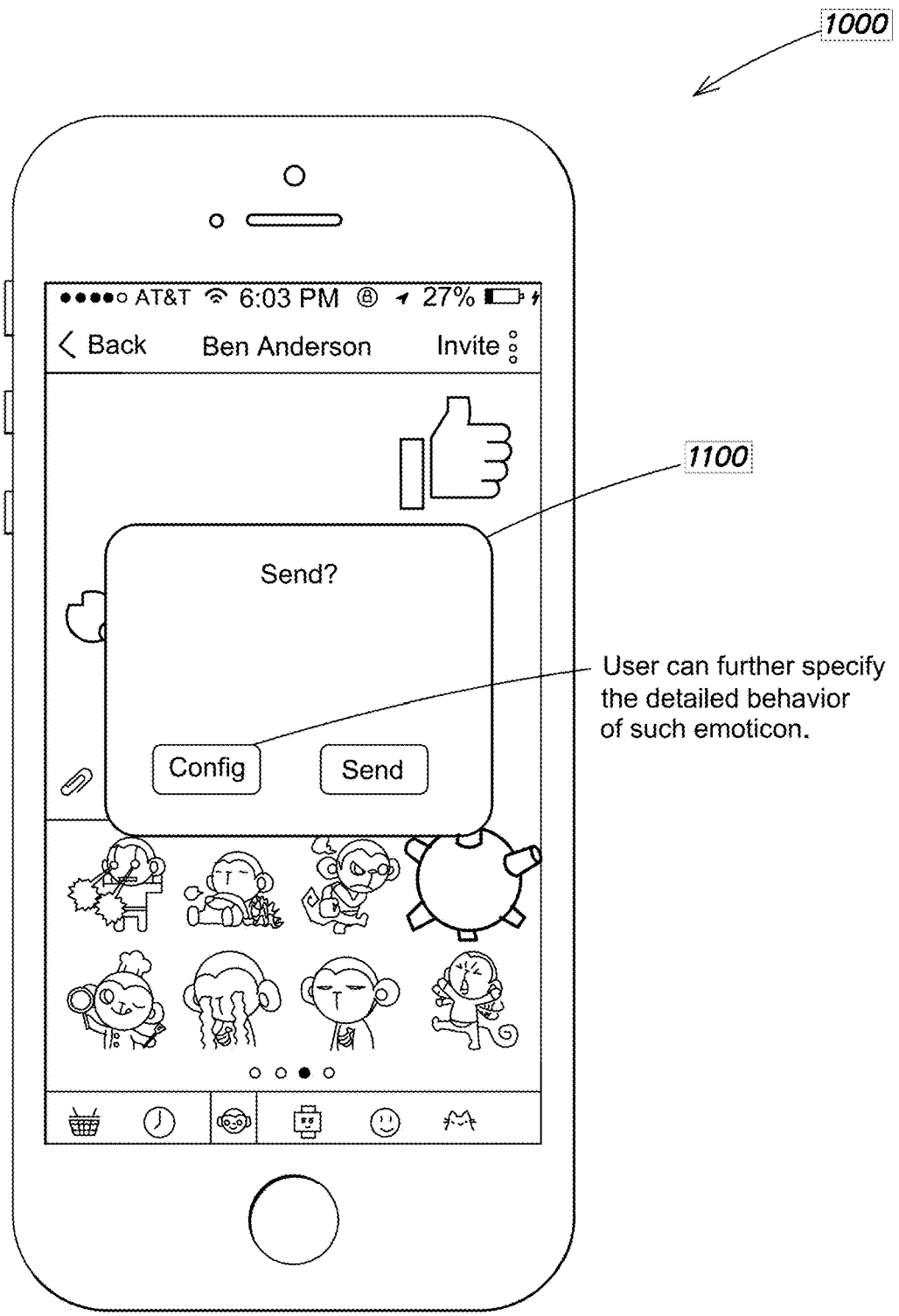
FIG. 11 is an illustration of a window provided by a GUI object of the enhanced messaging system.

In other embodiments, such as an embodiment illustrated with reference to FIG. 11, upon the representation 1002 of the first GUI object reaching a predefined proximity to the representation 1004 of the second GUI object and being dropped by the user (and thus being activated by the user), the first GUI object presents a modal window 1100 within the user interface provided by the mobile computing device 1000. The modal window prompts the user for input selecting either a send button or a config button. In response to receiving input selecting the send button, the representation 1002 of the first GUI object acts upon the representation 1004 of the second GUI object. This action may be displayed on any of the devices engaged in the message thread.

Figure 12:
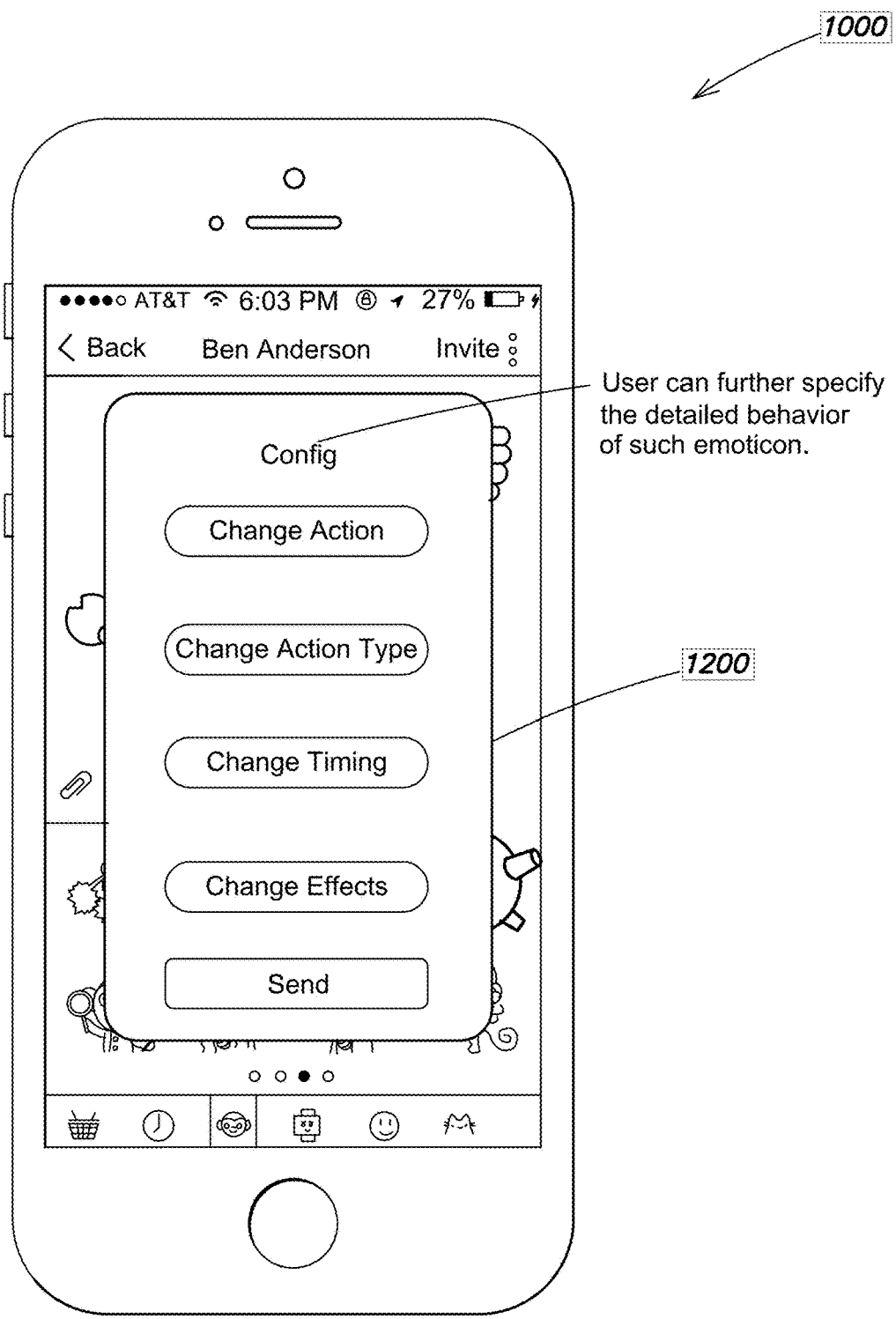
FIG. 12 is an illustration of another window provided by a GUI object of the enhanced messaging system.

With reference to FIG. 12, in response to receiving input selecting the config button, the first GUI object displays a modal window 1200 within the user interface provided by the mobile computing device 1000. This modal window 1200 enables the user to configure the configurable parameters of the first GUI object. As described further below, these configurable parameters enable the user to control the target of the first GUI object, the route the representation 1002 of the first GUI object will traverse, the actions the first GUI object will perform, the timing of the actions, and the animation displayed by the representation 1002 of the first GUI object.

In this embodiment, the modal window 1200 prompts the user for input selecting a change action button, a change action type button, a change timing button, a change effects button, or a send button. In response to receiving input selecting the change action button, the first GUI object displays a set of user interface elements through which the first GUI object receives changes to default values of configurable parameters that control an action performed by the first GUI object. The action performed by the first GUI object may include animation (with or without sound or vibration) displayed upon the representation 1002 of the first GUI object reaching its target. Example animations include a kiss, shaking hands, burning, exploding, shouting, kicking, dancing, tearing the background, changing the background, transforming size, transforming shape, transforming color, and displaying an advertisement in the message thread. Animations may be implemented as a sequence of frames.

In response to receiving input selecting the change action type button, the first GUI object displays a set of user interface elements through which the first GUI object receives changes to default values of configurable parameters that control a type of action performed by the first GUI object. Types of actions include one-way actions and multi-way actions. When executing under a one-way action configuration, the representation 1002 of the first GUI object acts upon another component, but does not react to any movement or action performed by the other component. When executing under a multi-way action configuration, the representation 1002 of the first GUI object acts upon another component, and reacts to any movement or reactions that are performed by one or more other components. The reaction performed by the first GUI object may include animation (with or without sound or vibration). Example animations include a resistance to burning, escape, blush, use a protective shield, change color, change shape, transform, bounce, transform size, transform shape, transform color, and displaying an advertisement in the message thread.

In response to receiving input selecting the change timing button, the first GUI object displays a set of user interface elements through which the first GUI object receives changes to default values of configurable parameters that control timing of an action performed by the first GUI object.

This timing may be a duration of an animation or a delay before executing the animation or some other action (e.g., transmitting a sentiment indicator to an object in FACEBOOK or purchasing an item associated with the first GUI object or a component acted upon by the first GUI object).

In response to receiving input selecting the change effects button, the first GUI object displays a set of user interface elements through which the first GUI object receives changes to default values of configurable parameters that control effects of an action performed by the first GUI object. These effects may include transforms or filters applied to the representation 1002 of the first GUI object or the target of an action performed by the first GUI object.

In response to receiving input selecting the send button, the representation 1002 of the first GUI object acts upon the representation 1004 of the second GUI object. This action may be displayed on any of the devices engaged in the message thread.

Figure 14:
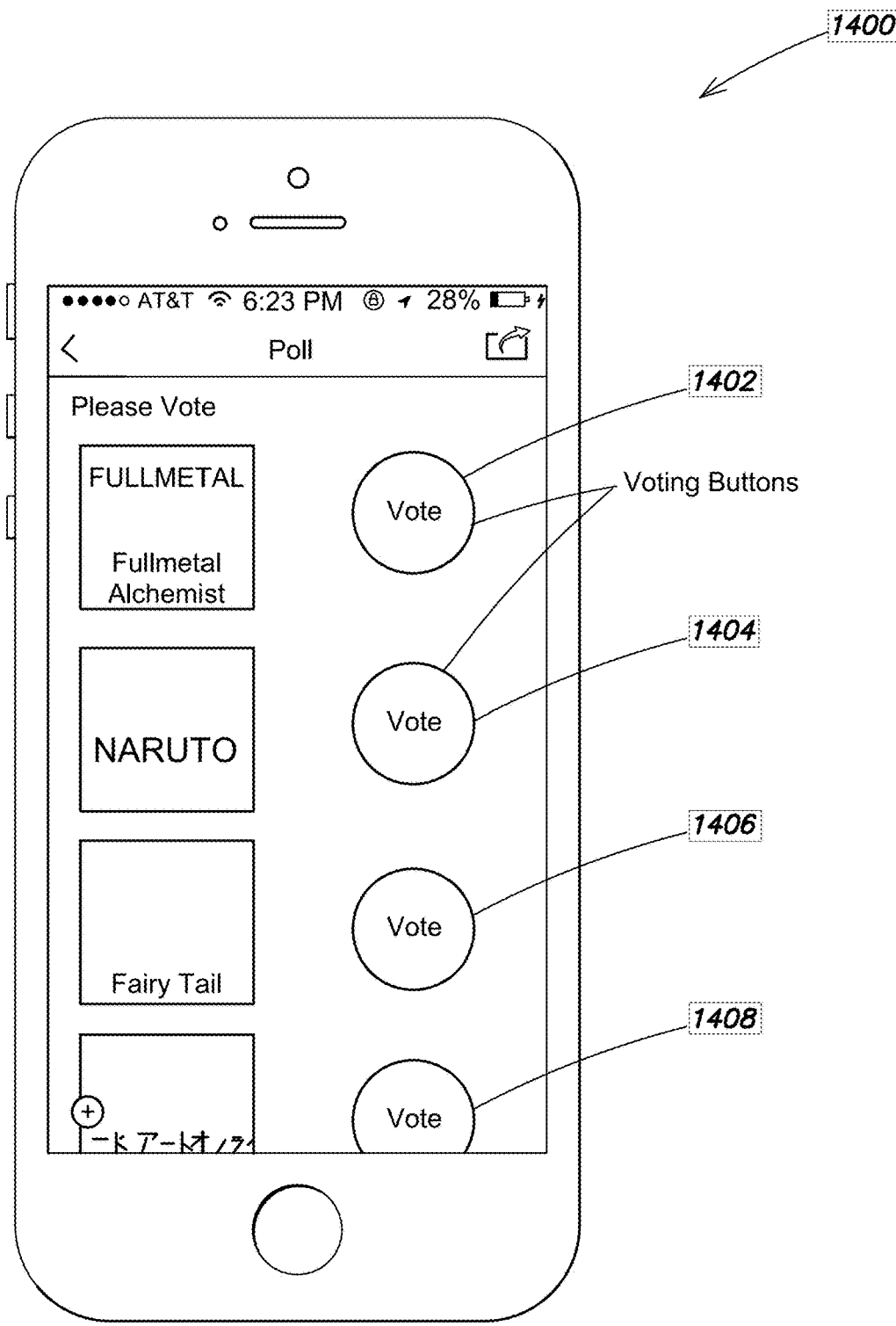
FIG. 14 is an illustration of a user interface screen including a representation of a set of variable-selection objects.

FIG. 14 illustrates another embodiment in which a user interface provided by a mobile computing device 1400 is configured to implement a set of variable-selection objects presenting representations 1402, 1404, 1406, and 1408. As illustrated in FIG. 14, when executing according to this configuration, the representation 1402 of a first variable-selection object includes a circular button that accepts voting selections from a user. More particularly, each of the representations 1402, 1404, 1406, and 1408 enable the user to vote for content preferred by the user. In this embodiment, each of the set of variable-selection objects is configured to acknowledge a first instance of a selection where the variable-selection object receives an indication that the user touched its corresponding representation and maintained contact for a first predetermined duration.

Figure 15:
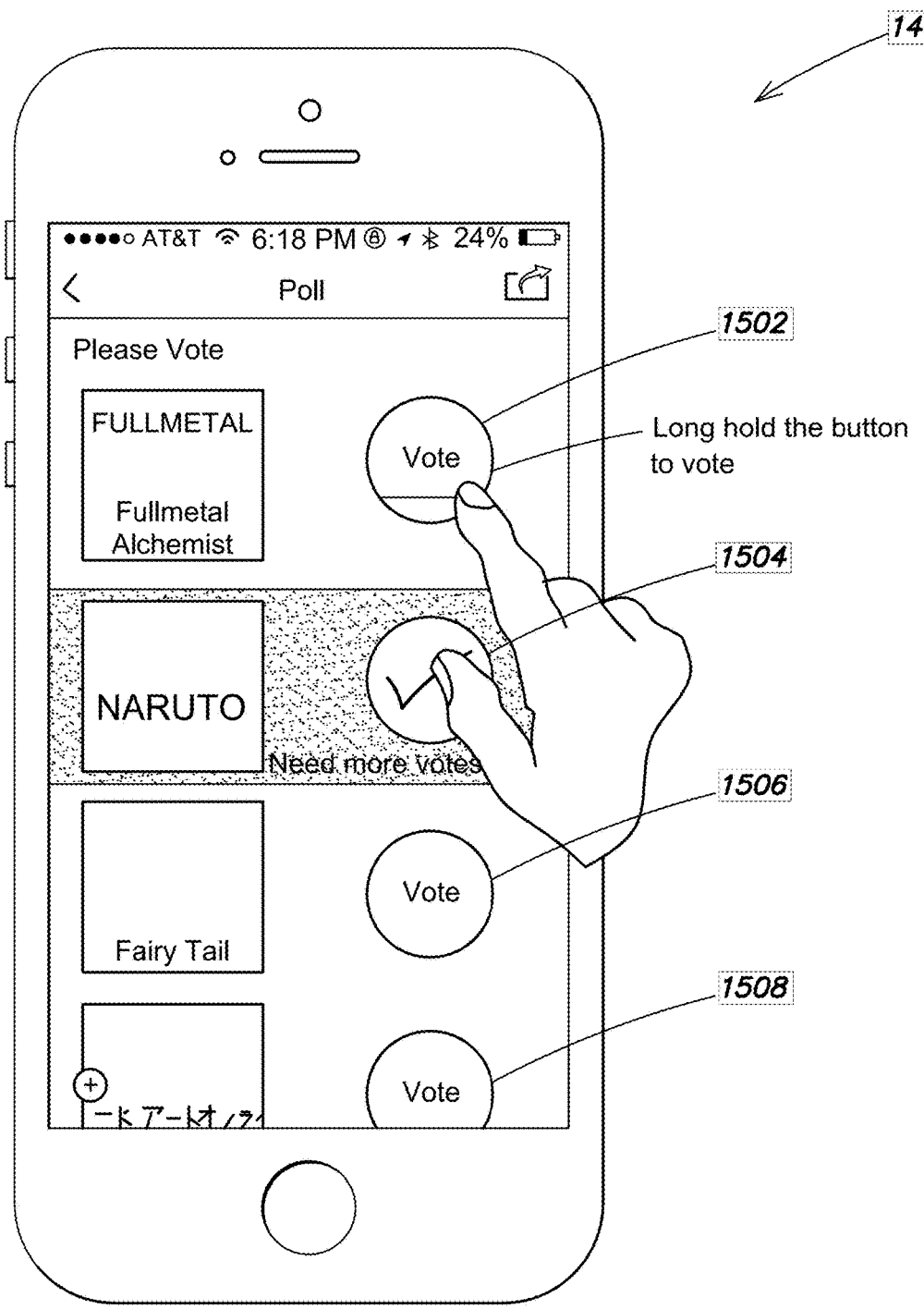
FIG. 15 is an illustration of a user interaction with one of the set of variable-selection objects.

FIG. 15 illustrates another embodiment in which a user interface provided by the mobile computing device 1400 is configured to implement a set of variable-selection objects presenting representations 1502, 1504, 1506, and 1508. As illustrated in FIG. 15, a first variable-selection object represented by the representation 1504 has acknowledged a first selection. In addition, a second variable-selection object represented by the representation 1502 is in the process of receiving a selection. As shown in FIG. 15, the second variable-selection object is configured to respond to a touch and hold of the representation 1502 performed by the user by filling the representation 1502 from bottom to top with a color different from the unselected color of the representation 1502. According to this embodiment, so long as the user maintains a hold on the representation 1502, the second variable-selection object will continue to fill the representation 1502 until it is completely filled. Responsive to the representation 1502 being completely filled, the variable-selection object will acknowledge the selection and adjust the representation 1502 to mimic a checkbox, as illustrated in the representation 1504. In some embodiments, the color of the representation 1504 may change based on the number of selections on the representation 1504.

Figure 16:
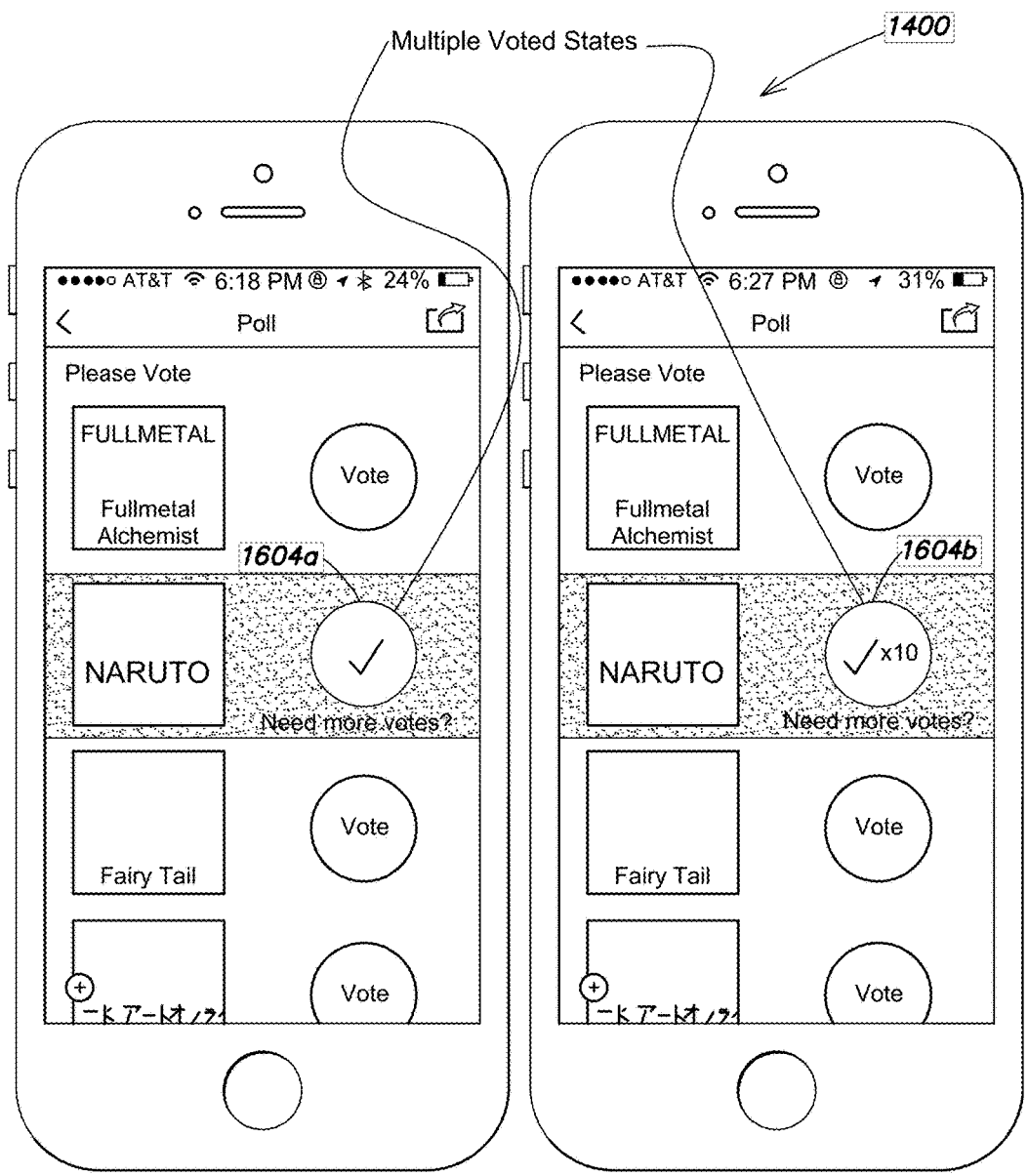
FIG. 16 is another illustration of a user interface screen including a representation of the set of variable-selection objects.

FIG. 16 illustrates another embodiment in which a user interface provided by the mobile computing device 1400 is configured to implement a variable-selection object presenting representations 1604a and 1604b at different times. At a first time, illustrated by the representation 1604a, the variable-selection object has acknowledged 1 selection. At a second time, illustrated by the representation 1604b, the variable-selection object has acknowledged 10 selections. In some embodiments illustrated by FIG. 16, the variable-selection object requires a hold of an adjusted duration prior to acknowledging each selection of a series of selections. In some embodiments, the duration increases linearly after each acknowledged selection. In other embodiments, the duration increases exponentially after each acknowledged selection. In still other embodiments, the duration adjustment is based on a configurable parameter and adjusts according to a user defined function having an independent variable equal to the number of previously acknowledged selections. In still other embodiments, the duration adjustment is based on a sequence of numbers or one or more lookup tables.

Figure 17:
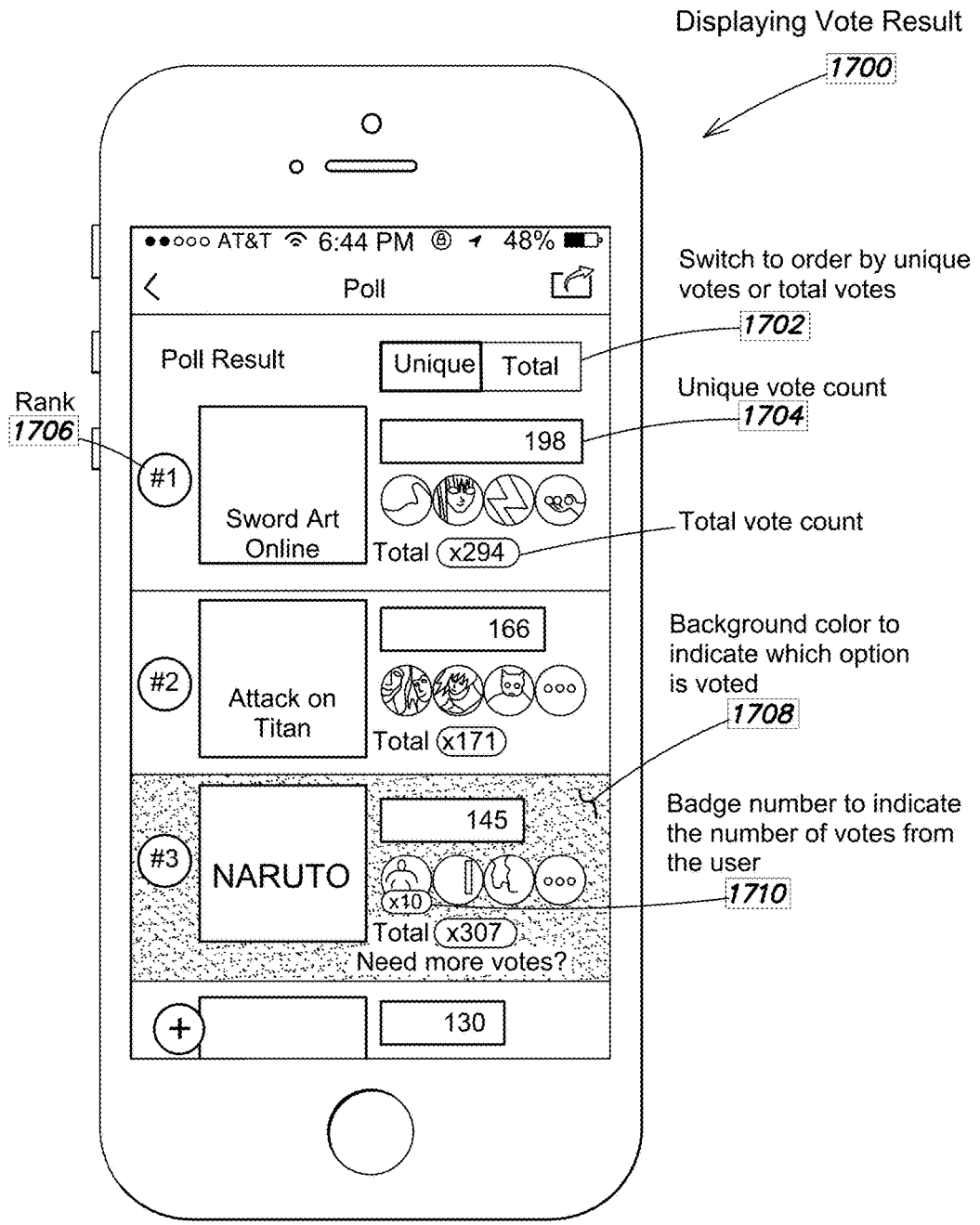
FIG. 17 is another illustration of a user interface screen including a representation of the set of variable-selection objects.

FIG. 17 illustrates another embodiment in which a user interface provided by a mobile computing device 1700 is configured to implement additional user interface elements based on a state of a set of variable-selection objects. As illustrated in FIG. 17, the user interface is directed to analyzing user preference poll results. The user interface includes a switch box 1702, a text box 1704, a rank icon 1706, a background area 1708, and a badge icon 1710. The switch box 1702 is configured to receive input from a user selecting either "total" or "unique" voting counts. When "total" is selected in the switch box 1702, the user interface ranks the content voted on by the total number of votes received (e.g., the total number of acknowledged selections). When "unique" is selected in the switch box 1702, the user interface ranks the content voted on by the total number of users who voted for the content (e.g., acknowledged selections over 1 are not used for ranking).

In an embodiment illustrated in FIG. 17, the text box 1704 is configured to display a unique vote count (e.g., the total number of users who generated acknowledged selections). The rank icon 1706 (and each of the other rank icons below it) is configured to display the current rank of the content displayed adjacent to it. The background area 1708 is configured to change color to highlight content for which the user has generated acknowledged selections. The badge icon 1710 is configured to display a number of acknowledged selections of this content generated by the user. In other embodiments, the vote counts may be updated and displayed in real time adjacent to a set of variable-selection objects. In these embodiments, the mobile computing device may update the vote count for a variable-selection object as the variable-selection object receives a selection.

Figure 21:
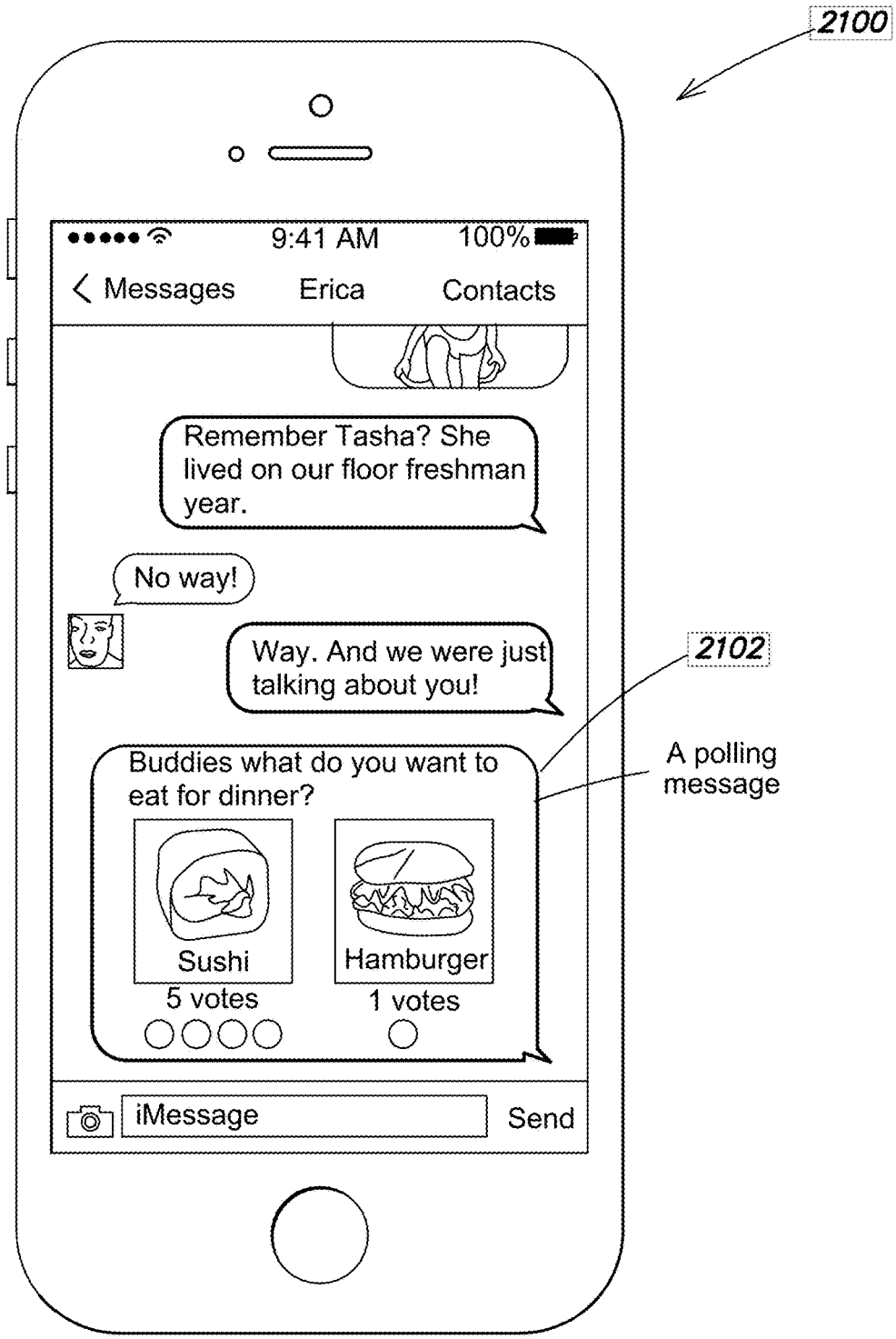
FIG. 21 is an illustration of a message thread including a representation of a poll object provided by the enhanced messaging system.
Figure 22:
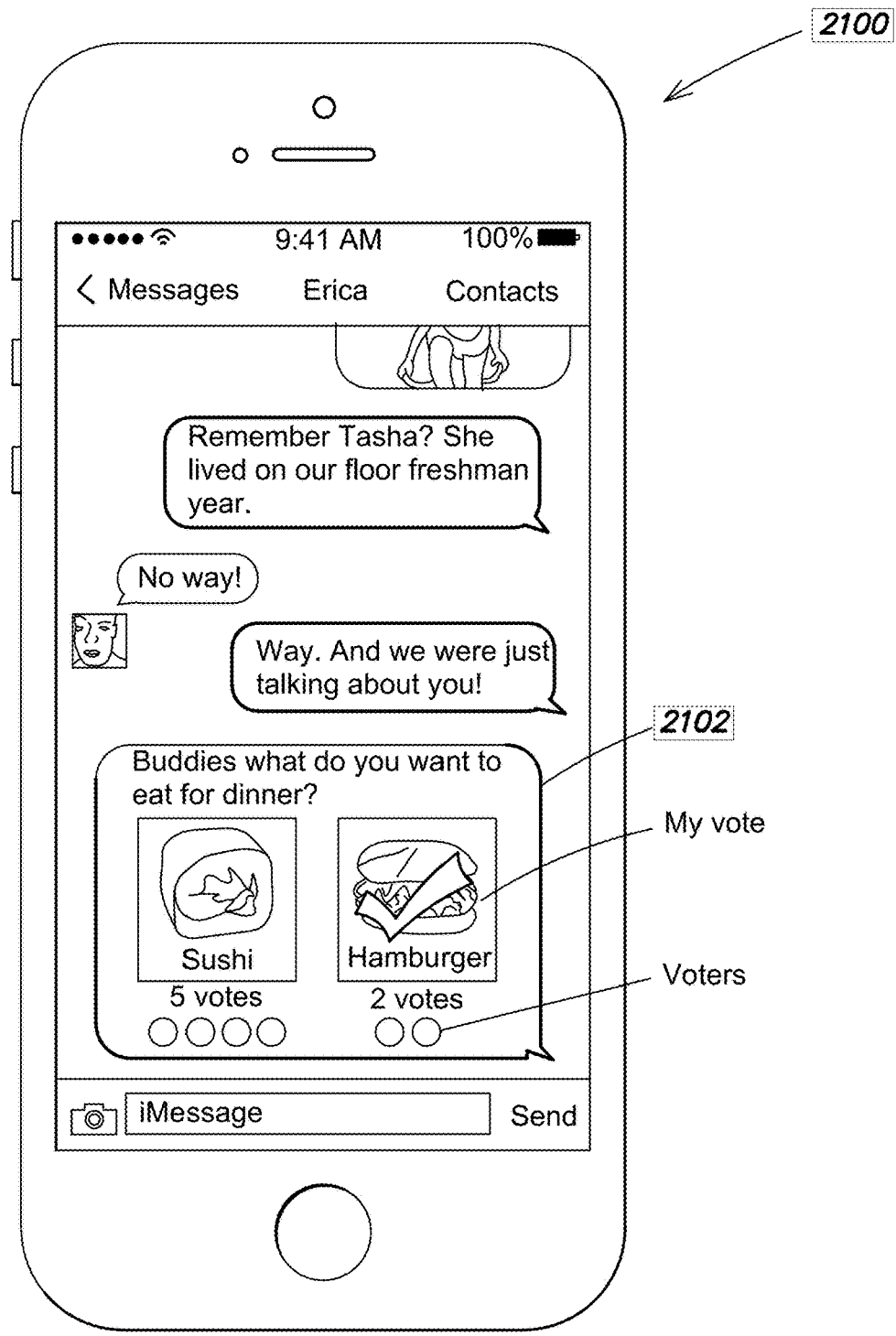
FIG. 22 is another illustration of a message thread including a representation of a poll object provided by the enhanced messaging system.

FIG. 21 illustrates another embodiment in which a user interface provided by a mobile computing device 2100 is configured to implement a poll object presenting a representation 2102 within a message thread. As illustrated in FIG. 21, when executing according to this configuration, the representation 2102 includes text descriptive of the subject of the poll (e.g., "Buddies what do you want to eat for dinner"), two options displayed as an image and accompanying text (e.g., "Sushi" and "Hamburger"), a count of selections for each option ("5 votes" and "1 vote"), and a representation (e.g. a badge icon) of each user who selected for each option. In this embodiment, the representation 2012 is configured to receive input selecting one or more of the options. Responsive to receiving the input, the poll object records the selection of the option and updates the image of the selected option, the count of selections for the selected option, and adds a representation of the user who selected the option to the representation of each user who selected for the option. FIG. 22 illustrates the representation 2012 after the poll object acknowledges the selection of the "Hamburger" option. As shown in FIG. 22, the "Hamburger" option now includes an indication that it was selected (e.g., a checkmark), the count of selections for the "Hamburger" option has been increased by 1, and the representation of each user who selected the "Hamburger" option includes a representation of the user who selected the option. These updates may be displayed on any of the devices engaged in the message thread. In this way, the poll object allows users communicating via a common conduit to express preferences from a set of options.

In at least one embodiment, the representation 2102 may be configured to receive multiple votes from a user. The poll object may keep track of unique votes and total votes for each option. The options may be displayed as representations of variable-selection objects, and require inputs of predetermined durations to successfully receive a vote selection. In other embodiments, the representation 2102 may be configured to receive a first vote from a user on a first option (e.g., "Sushi") and process the first vote. The representation 2102 may then receive a second vote on a second option (e.g., "Hamburger") and process the second vote by subtracting the vote away from the first option and adding a vote to the second option. A representation of the user may also move from the first option to the second option and the total number of votes on each option may be updated. In one example, if a first option receives multiple votes from a user and then a second option receives a vote from the same user, the multiple votes may be subtracted from the first option.

In some implementations, a poll object may include multiple options that may be selected. For example, the poll object may allow users to vote for three out of five options. The poll object may also allow users to rank options (e.g., click on options in an order to rank them by that order). In one example, a poll may include representations of ten wedding dresses and the poll object may be configured to receive five ordered votes for the dresses. The representation 2102 may receive up to five ordered votes from different users and display voting results. Each voting rank may be associated with a weight (e.g., a dress ranked number one by a user may have a weight of five but a dress ranked number 5 by a user may have a weight of one). In the results, the poll object may display the wedding dresses in order from highest weight to lowest weight. The results may be displayed below the vote options. In another example, the current number rank of each dress may be displayed within the option for the dress. In other examples, a user may click and hold the representation 2102 and the poll object may be configured to change the representation 2102 to a view of the voting results.

In some embodiments, the poll object presenting the representation 2102 may be configured to present the representation 2102 as the most recent message in the message thread while the poll object is active. For example, in the message thread illustrated in FIG. 31, the representation 2102 is at the bottom of the message thread. In these embodiments, subsequent messages may be presented above the representation 2102 until the voting process is complete. In some examples, the poll object may be configured to receive a number of votes to complete. In other examples, the poll object may be configured to complete after a predetermined period of time. In further examples, the poll object may complete when the representation 2102 receives input from all of the users in the message thread. In another example the user who started the poll or a user designated as an administrator in the message thread may choose to end a poll. The poll object may be configured to receive a click on the representation 2102 to end the poll from a user. The poll object may update the representation 2102 in response to a user input. The user input may include a click on the representation 2102, a click and hold on an option in the representation 2102, a user interface object with an option in the representation 2102 as a target, and a text input for an option (e.g., the message thread may receive "Hamburger" from a user and update the representation 2102 based on the text input).

In other embodiments, the poll object presenting the representation 2102 may be configured to present the representation 2102 as a pop-up or floating object in the message thread, such that users have to reply before going back to the message thread. In some examples, wherein the representation 2102 is not stuck in place as the most recent message in the message thread, a user may move the representation 2102 back to the most recent message spot. The representation may be moved by a click on the representation 2102 by a creator of the poll object or an administrator or a drag-and-drop of the representation 2102. In some examples, the representation 2102 may automatically be moved to the top via a received message. For example, a message (e.g., "poll," "vote," "bump," etc.) may be inputted by a user to bring the representation 2102 to the most recent spot in a message thread.

Figure 23:
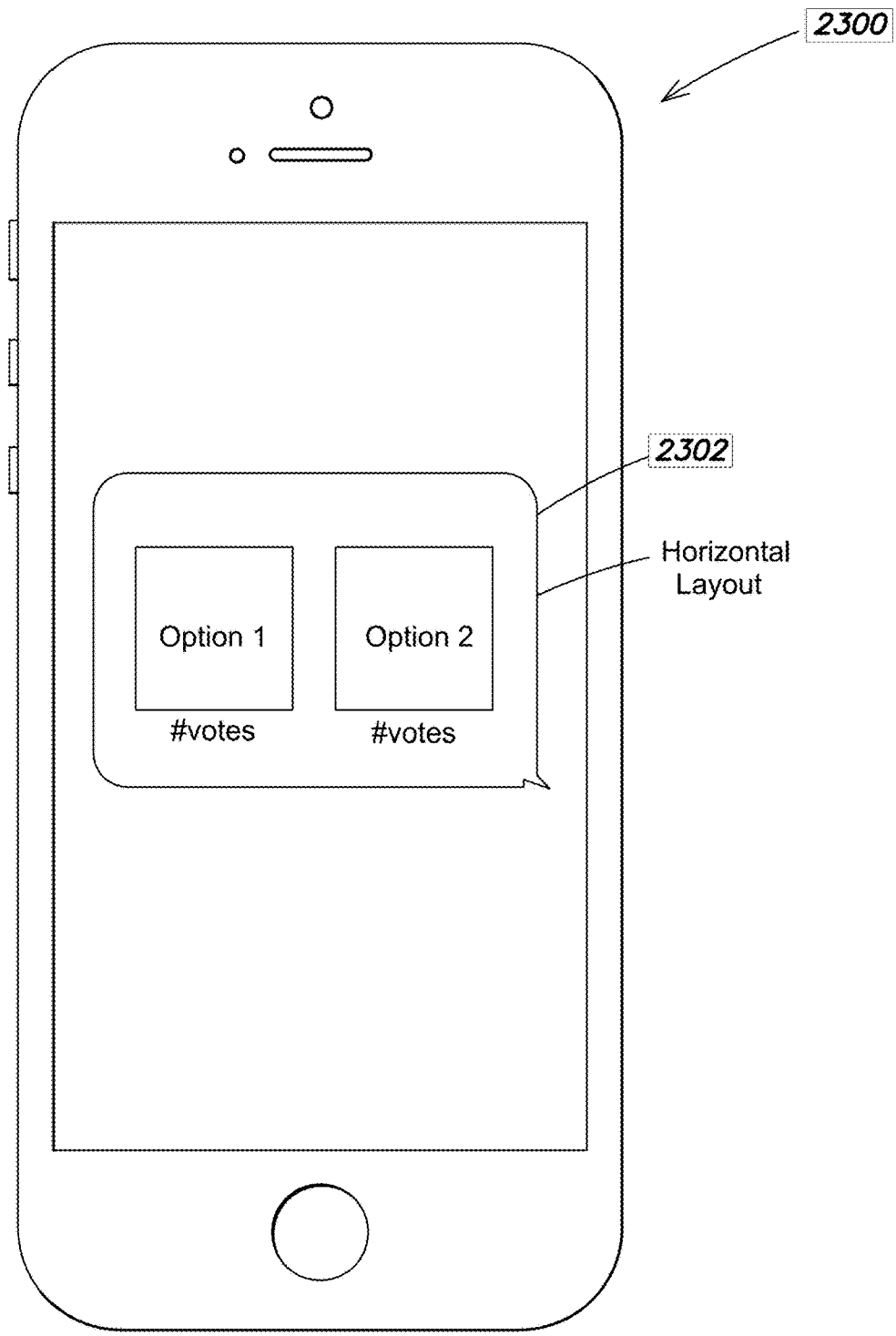
FIG. 23 is another illustration of a message thread including a representation of a poll object provided by the enhanced messaging system.
Figure 24:
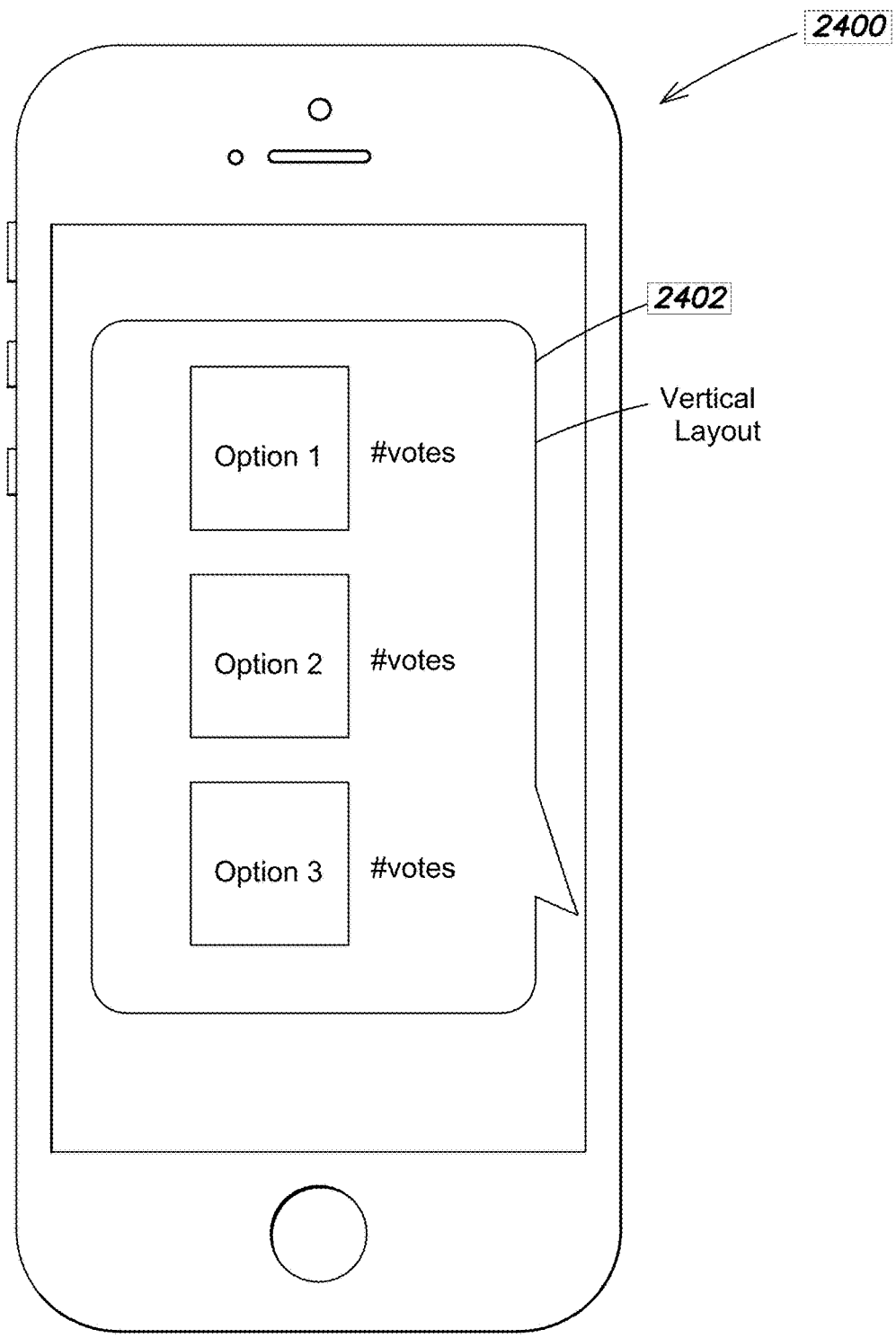
FIG. 24 is another illustration of a message thread including a representation of a poll object provided by the enhanced messaging system.

A representation of a poll object may be structured in a variety of ways. For example, the poll object may be configured to display a representation of the poll object that displays options within a horizontal layout. FIG. 23 illustrates a representation 2302 of a poll object implemented by a mobile device 2300 that is configured to display a representation having a horizontal layout. As shown in FIG. 23, each option is positioned to the left or right of the other. In another example, a poll object may be configured to display a representation of the poll object that displays options within a vertical layout. FIG. 24 illustrates a representation 2402 of a poll object implemented by a mobile device 2400 that is configured to display a representation having a vertical layout. As shown in FIG. 24, each option is positioned adjacent to the top or bottom of the other. While the description of FIGS. 7-12, 14-17, and 21-24 focus on embodiments directed to mobile computing devices, embodiments disclosed herein may be implemented using any computer system and are, therefore, not limited in scope to mobile computing devices.

Object Processes

Figure 13:
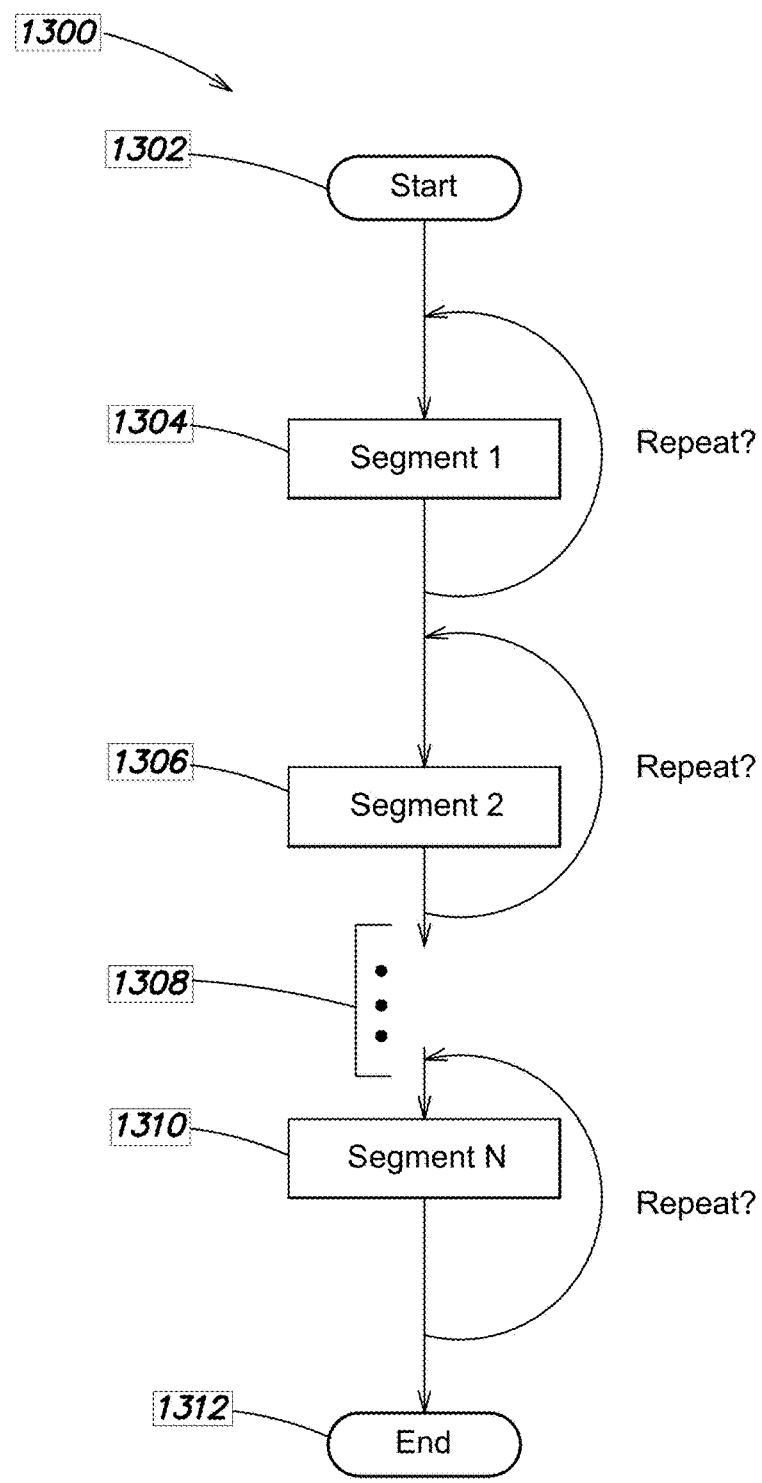
FIG. 13 is a flow diagram illustrating a segmented execution process executed by a GUI object within the enhanced messaging system.

FIGS. 13, 18-20, and 25 illustrate example processes executed by GUI objects, variable-selection objects, and poll objects. As described above with reference to FIG. 1, some embodiments include GUI objects that perform processes that execute one or more actions within segments. The GUI objects that perform these processes may execute within a wide variety of computer systems, such as the enhanced messaging system 100 described above with reference to FIG. 1. FIG. 13 illustrates an example execution process 1300 in accord with the embodiments disclosed herein. As illustrated in FIG. 13, the execution process 1300 may include any number of distinct execution segments. The execution process 1300 begins at 1302.

In act 1304, a first segment is executed. The first segment may include execution of an action by a GUI object, such as the GUI object 126 described above with reference to FIG. 1. This action may include movement of a representation of the GUI object within a message thread, animation of the representation, or performing an action involving another component of the message thread. One example of an action process executed by a GUI object is described further below with reference to FIG. 19. As illustrated in FIG. 13, the first segment may repeat through one or more iterations.

In acts 1306, 1308 and 1310 multiple additional segments are executed. Each of these segments may include execution of an action by a GUI object. This action may include movement of a representation of the GUI object within a message thread, animation of the representation, or performing an action involving another component of the message thread. Each of the multiple other segments may repeat through one or more iterations.

The execution process 1300 ends at 1312. Processes in accord with the execution process 1300 enable computer systems to display representations of GUI objects that are highly engaging due to their dynamic and interactive nature. Thus such processes increase the entertainment value and enjoyment of users.

Figure 18:
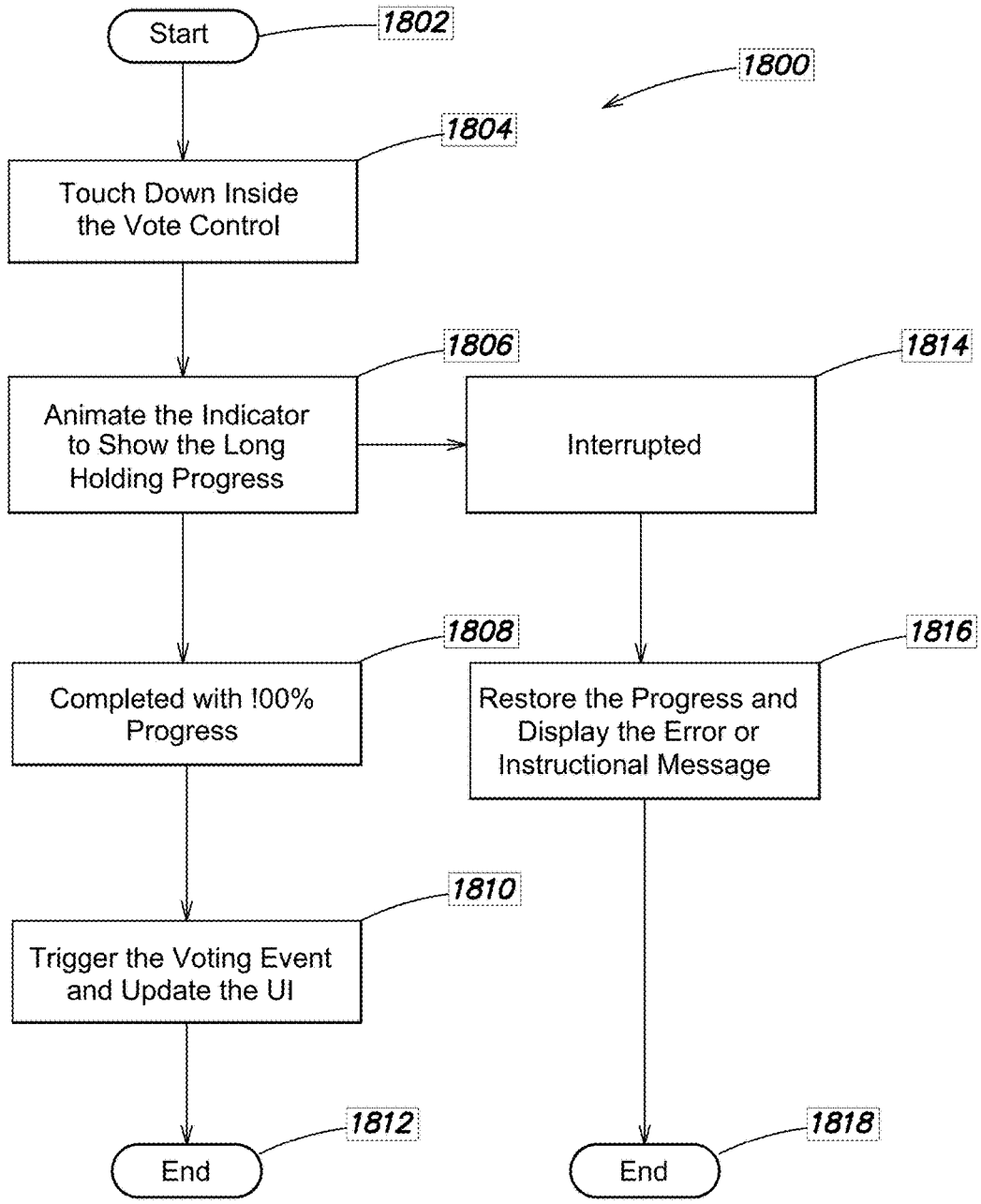
FIG. 18 is a flow diagram illustrating a selection process executed by a variable-selection object.

As described above with reference to FIG. 1, some embodiments include variable-selection objects that perform processes that vary conditions for acknowledgement of selections between selections attempted in series. The variable-selection objects that perform these processes may execute within a wide variety of computer systems, such as the enhanced messaging system 100 described above with reference to FIG. 1. FIG. 18 illustrates an example selection process 1800 in accord with the embodiments disclosed herein. The selection process 1800 begins at 1802.

In act 1804, a variable-selection object, such as the variable-selection object 128 described above with reference to FIG. 1, receives input from a user indicating that the user is attempting to select a representation presented by the variable-selection object. For example, the variable-selection object may receive input indicating that the user has touched the representation. In act 1806, the variable-selection object animates its representation to indicate that the attempted selection is in process. In act 1808, the variable-selection object acknowledges the attempted selection once the process has completed (e.g., once the attempted selection has been maintained for a predetermined duration). In act 1810, the variable-selection object records the acknowledged selection and updates its representation to indicate the acknowledged selection to the user and proceeds to 1812. Updating the representation to indicate the acknowledged selection may include alteration of the color or shape of the representation.

In act 1814, the variable-selection object receives input (or a lack thereof) that indicates the attempted selection has been discontinued. Examples of discontinuities within an attempted selection include cancellation by an operating system or application (e.g., view disappears or an incoming call appears), a touch up is detected outside the representation, a touch up is detected inside the representation before the selection has been acknowledged, a touch is dragged outside the vicinity of the representation, and a touch is detected outside the representation. In act 1816, the variable-selection object resets its representation to pre-animation state and, optionally, displays an error or instructional message that communicates user actions required to complete a selection and proceeds to 1818.

The selection process 1800 ends at either 1812 or 1818. Processes in accord with the execution process 1800 enable computer systems to display representations of variable-selection objects that are highly engaging due to their dynamic nature. Thus such processes increase the entertainment value of products including them.

Figure 19:
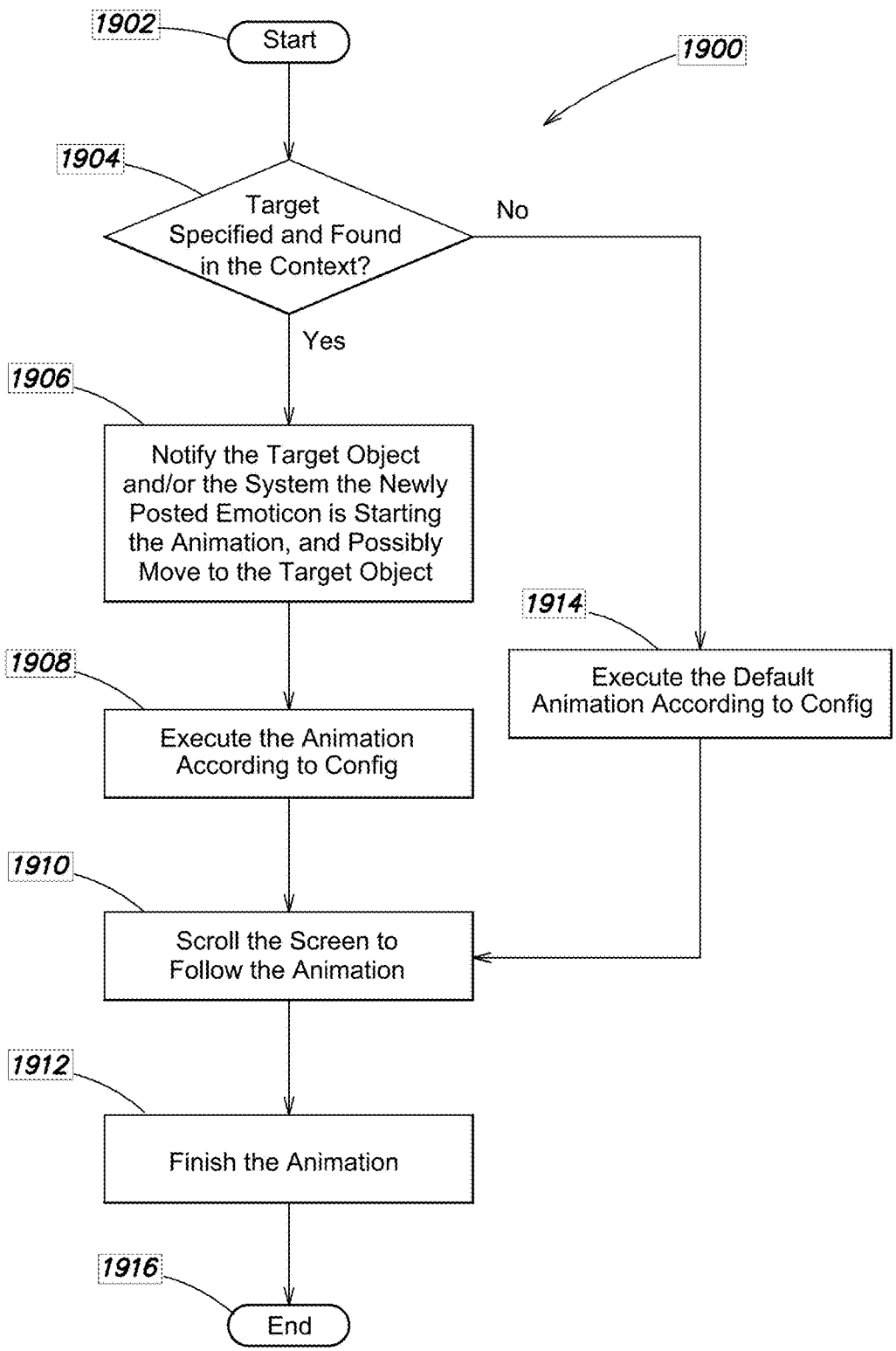
FIG. 19 is a flow diagram illustrating an action process executed by a GUI object within the enhanced messaging system.

As described above with reference to FIGS. 8 and 13, some embodiments include GUI objects that perform processes that execute actions within a message thread. The GUI objects that perform these processes may execute within a wide variety of computer systems, such as the enhanced messaging system 100 described above with reference to FIG. 1. FIG. 19 illustrates an example action process 1900 in accord with the embodiments disclosed herein. The action process 1900 begins at 1902.

In act 1904, a GUI object, such as the GUI object 126 described above with reference to FIG. 1, determines whether it can identify its target within the message thread. This identification may be accomplished via a variety of component traits described above with reference to the target configurable parameter. If so, the GUI object executes act 1906. Otherwise, the GUI object executes act 1914. In the act 1914, the GUI object presents and animates its representation within the message thread according to its default configuration. In the act 1906, any components affected by the GUI object's imminent action are notified of the GUI object, and its characteristics. In act 1908, the GUI object presents and animates its representation with the message thread. In act 1910, the GUI object scrolls the screen as needed to continue the animation (e.g., where the animation leads to locations within the message thread that are not visible in the display screen prior to scrolling). In act 1912, the GUI object finishes the animation of its representation and any other configured actions. Where the animation has a negative connotation (e.g., burning), the GUI object may execute an action that transmits sentiment information regarding the target to a third party system, such as one of the third party systems 124 described above with reference to FIG. 1 (e.g., FACEBOOK). Alternatively, wherein the animation has a positive connotation (e.g., kiss), the GUI object may execute an action that initiates a purchase request with a third party system.

The execution process 1900 ends at 1916. Processes in accord with the execution process 1900 enable computer systems to display representations of GUI objects that are highly engaging due to their dynamic and interactive nature. Thus such processes increase the entertainment value and enjoyment of users.

Figure 20:
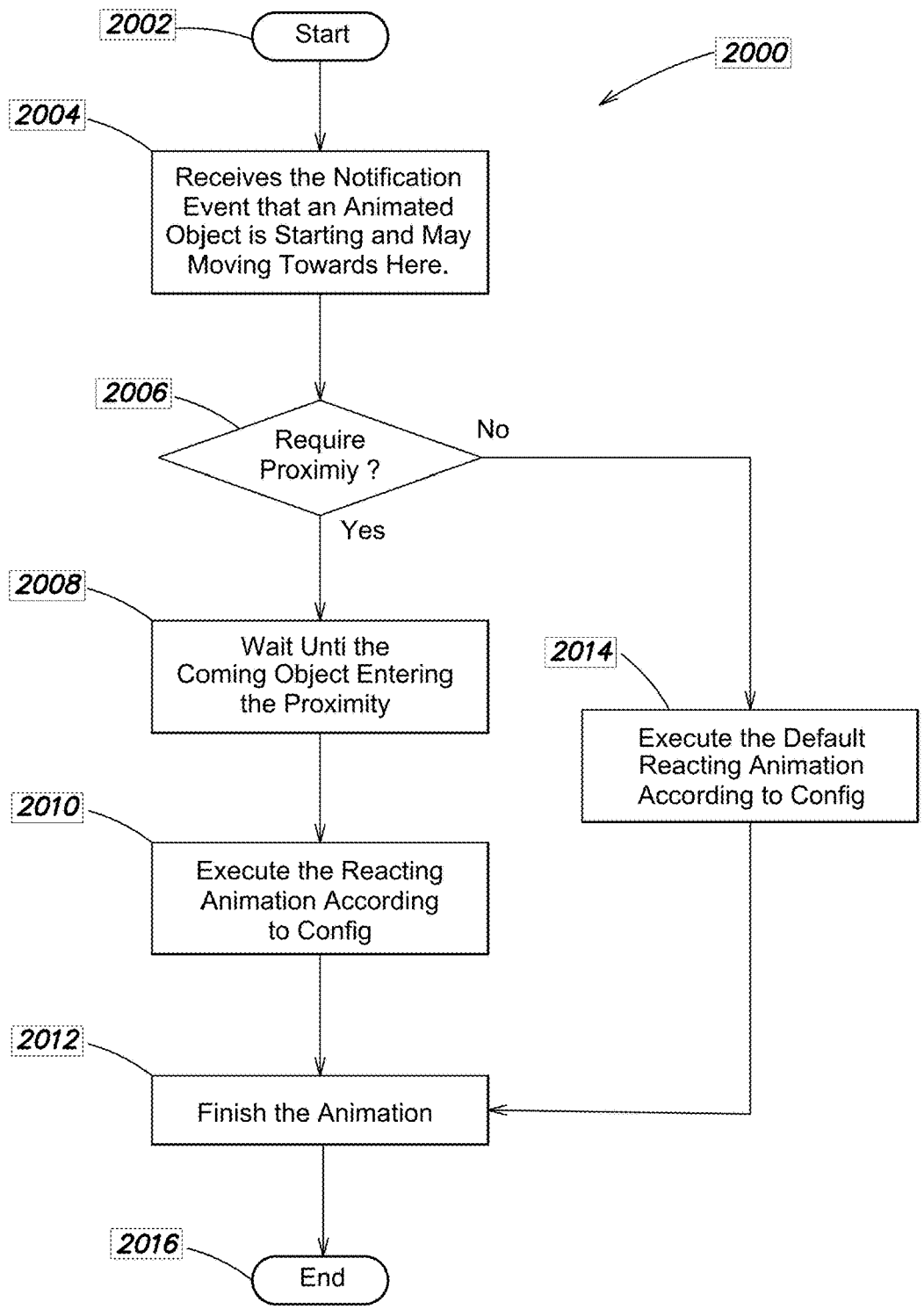
FIG. 20 is a flow diagram illustrating a reaction process executed by a GUI object within the enhanced messaging system.

As described above with reference to FIG. 8, some embodiments include GUI objects that perform processes that execute reactions within a message thread. The GUI objects that perform these processes may execute within a wide variety of computer systems, such as the enhanced messaging system 100 described above with reference to FIG. 1. FIG. 20 illustrates an example action process 2000 in accord with the embodiments disclosed herein. The reaction process 2000 begins at 2002.

In act 2004, a first GUI object, such as the GUI object 126 described above with reference to FIG. 1, receives a notification that a representation of a second GUI object, such as the GUI object 130 described above with reference to FIG. 1, may affect a representation of the first GUI object. This notification may be received from the second GUI object. In act 2006, the first GUI object determines whether the representation of the second GUI object will come with a predefined proximity of the representation of the first GUI object. If so, the first GUI object executes act 2008. Otherwise, the first GUI object executes act 2014. In the act 2014, the first GUI object animates its representation within the message thread according to its default configuration. In the act 2008, the first GUI object waits until the representation of the second GUI object enters the predefined proximity to the representation of the first GUI object. In act 2010, the first GUI object presents and animates its representation with the message thread according to its reaction configuration. In act 2012, the first GUI object finishes the animation of its representation and any other configured actions.

The execution process 2000 ends at 2016. Processes in accord with the execution process 2000 enable computer systems to display representations of GUI objects that are highly engaging due to their dynamic and interactive nature. Thus such processes increase the entertainment value and enjoyment of users.

Figure 25:
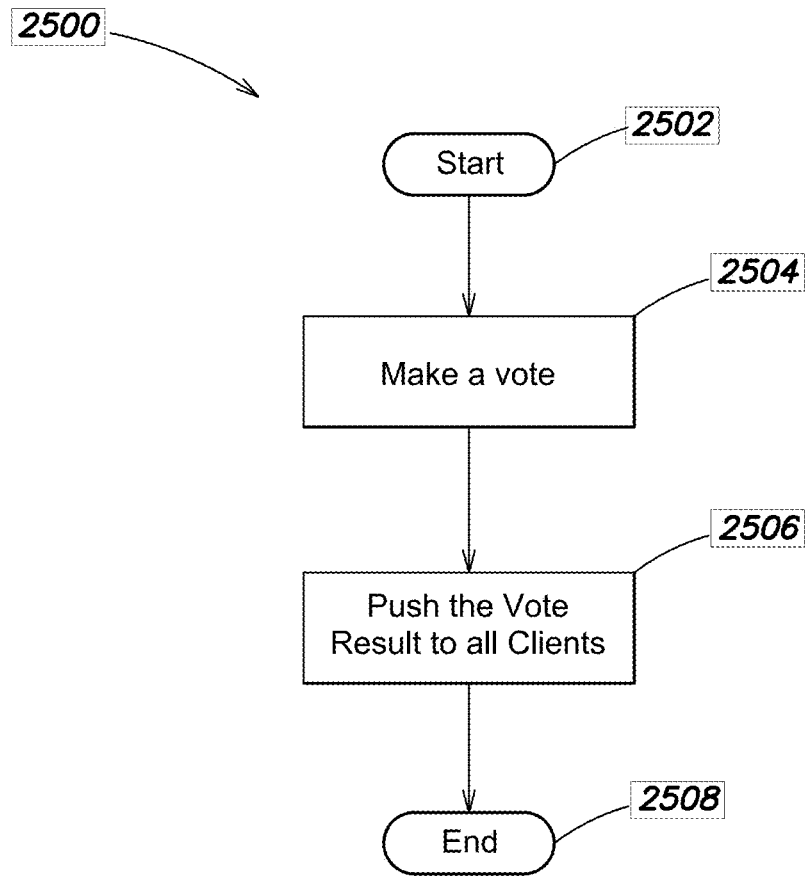
FIG. 25 is a flow diagram illustrating a polling process executed by a poll object within the enhanced messaging system.

As described above with reference to FIG. 1, some embodiments include poll objects that perform processes that poll users for selection of preferences. The poll objects that perform these processes may execute within a wide variety of computer systems, such as the enhanced messaging system 100 described above with reference to FIG. 1. FIG. 25 illustrates an example polling process 2500 in accord with the embodiments disclosed herein. As illustrated in FIG. 25, the polling process 2500 includes receiving a selection and updating poll results displayed on each user interface. The execution process 2500 begins at 2502.

In act 2504, input is received that indicates a selection of a preference. In some embodiments, this input is received via a user interface, such as the user interface 108 described above with reference to FIG. 1, and provided to a poll object, such as the poll object 132 described above with reference to FIG. 1. In act 2506, updated results are transmitted to all devices engaged in the message thread implementing the poll object. In some embodiments, the poll object processes the input it received in the act 2504 and transmits updated poll results to other poll objects executing on other devices engaged in the message thread. Upon receipt of the updated poll results, the other poll objects may display the updated poll results within their respective representations within the message thread.

The execution process 2500 ends at 2508. Processes in accord with the execution process 2500 enable computer systems to display representations of poll objects that are highly engaging due to their dynamic and interactive nature. Thus such processes increase the entertainment value and enjoyment of users.

Processes 1300, 1800, 1900, 2000, and 2500 each depict one particular sequence of acts in a particular embodiment. The acts included in these processes may be performed by, or using, one or more computer systems specially configured as discussed herein. Some acts are optional and, as such, may be omitted in accord with one or more embodiments. Additionally, the order of acts can be altered, or other acts can be added, without departing from the scope of the embodiments described herein. Furthermore, as described above, in at least one embodiment, the acts are performed on particular, specially configured machines, namely an enhanced messaging system configured according to the examples and embodiments disclosed herein.

Having thus described several aspects of at least one example, it is to be appreciated that various alterations, modifications, and improvements will readily occur to those skilled in the art. For instance, examples and embodiments disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system for providing an interactive chat interface comprising: a memory;
   at least one processor coupled to the memory; a user interface component executed by the at least one processor and configured to:
   receive, from a first user via a first device, a dynamic user input to select a first object from a plurality of objects to display within a message thread of the interactive chat interface, the message thread comprising a display of a list of ordered messages between the first user and at least one second user;
   in response to receiving the user input selecting the first object to display within the message thread, present a representation of the first object within the message thread of the interactive chat interface at least in part by integrating the representation of the first object within the display of the list of ordered messages;
   receive, from the first user via the first device, a user input specifying a first user interface action associated with the representation of the first object, the first user interface action comprising an animation performed by the representation of the first object;
   set a target element, separate from the representation of the first object, in the interactive chat interface upon which the representation of the first object is to apply the first user interface action, wherein the target element is shown in a display of the interactive chat interface on a second device;
   and trigger execution of the first user interface action on the target element, wherein the first user interface action dynamically affects a
   visualization of the target element shown in the display of the interactive chat interface on the second device, wherein the execution of the first user interface action renders a display of the animation of the representation of the first object performing the first user interface action on the target element, wherein:
   the animation comprises simulation of an action being performed on the target element shown in the display of the interactive chat interface on the second device and includes movement relative to the target element, and
   the simulation occurs in a display of the message thread on the second device.

2. The system according to claim 1, wherein the target element includes a representation of a second object.

3. The system according to claim 2, wherein the user interface component is configured to:
   receive a user input specifying a second user interface action, the second user interface action comprising an animation performed by the representation of the second object; and
   trigger execution of the second user interface action responsive to the execution of the first user interface action.

4. The system according to claim 2, wherein the user interface component is configured to:
   receive a user input specifying a second user interface action, the second user interface action comprising an animation performed by the representation of the second object; and
   trigger execution of the second user interface action before the execution of the first user interface action.

5. The system according to claim 1, wherein the user interface component is configured to trigger execution of the first user interface action responsive to the representation of the first object being proximate to the target element.

6. The system according to claim 1, wherein the user interface component is further configured to:
   set the target element in the interactive chat interface responsive to receiving, from the user, a second input specifying the target element; and
   set a default element as the target element in the interactive chat interface responsive to triggering execution of the first user interface action without receiving the second input specifying the target element.

7. The system according to claim 1, wherein the animation includes a route of movement of the representation of the first object to the target element, the route based on relative positions of the representation of the first object and the target element.

8. The system according to claim 7, wherein the route comprises at least one of a line and a curve.

9. The system according to claim 7, wherein the user interface component is further configured to receive a drag and drop on the representation of the first object to the target element to define the route.

10. The system according to claim 7, wherein the representation of the first object has a first location in the message thread, and the target element has a second location in the interactive chat interface, wherein the route of movement is from the first location to the second location and at least a portion of the route of movement is in the message thread.

11. The system of claim 10, wherein the first location comprises a first set of coordinates in the interactive chat interface and the second location comprises a second set of coordinates in the interactive chat interface.

12. The system according to claim 1, wherein the first user interface action includes at least one of a sound and a vibration.

13. The system according to claim 1, wherein the target element includes at least one of user name, a user icon, a poll object, a variable-selection object, an image, a video, a user profile, and a message.

14. The system according to claim 1, wherein the user interface component is further configured to:
 restrict access to a plurality of objects including the first object;
 receive funds from the user for access to at least one of the plurality of objects, the at least one of the plurality of objects including the first object; and
 allow use of the at least one object responsive to receiving the funds from the user.

15. The system according to claim 1, wherein the user interface component is further configured to receive a user input specifying a duration according to which the first user interface action is executed.

16. The system according to claim 1, wherein the first representation includes at least one of a bitmap image, a vector image, an animated image, a video, and a character of a special font.

17. The system according to claim 1, wherein the user interface component is further configured to be implemented within a messaging application on a social media system.

18. The system according to claim 1, wherein the user interface component is further configured to receive the target element from another user.

19. The system according to claim 1, wherein the user interface component is further configured to:
 present configuration options for the first user interface action associated with the representation of the first object;
 receive a user input specifying at least one configuration option for the first user interface action based on the presented configuration options; and
 update the first user interface action based on the received at least one configuration option.

20. The system of claim 1, wherein the user interface component is further configured to select the target element from a plurality of elements displayed within the message thread.

21. The system of claim 1, wherein integrating the representation of the first object within the display of the list of ordered messages comprises including the representation of the first object in a message within the list of ordered messages.

22. A graphical user interface (GUI) for providing an interactive chat interface, the graphical user interface comprising:
 a display on a first device executed by at least one processor,
 wherein the GUI is configured to:
 receive, from a first user via the first device, a dynamic input to select a first object from a plurality of objects to display within a message thread of the interactive chat interface, the message thread comprising a display of a list of ordered messages between the first user and at least one second user;
 in response to receiving the user input selecting the first object to display within the message thread, present a representation of the first object within the message thread of the interactive chat interface at least in part by integrating the representation of the first object within the display of the list of ordered messages;
 receive, from the first user via the first device, a user input specifying a first user interface action associated with representation of the first object, the first user interface action comprising an animation performed by the representation of the first object;
 set a target element, separate from the representation of the first object, in the interactive chat interface upon which the representation of the first object is to apply the first user interface action, wherein the target element is shown in a display of the interactive chat interface on a second device;
 and trigger execution of the first user interface action on the target element, wherein the first user interface action dynamically affects a visualization of the target element shown in the display of the interactive chat interface on the second device, wherein the execution of the first user interface action renders a display of the animation of the representation of the first object performing the first user interface action on the target element, wherein:
 the animation comprises simulation of an action being performed on the target element shown in the display of the interactive chat interface on the second device and includes movement relative to the target element, and
 the simulation occurs in a display of the message thread on the second device.

23. A method for providing an interactive chat interface, the method comprising:
 receiving, by a user interface component from a first user via a first device, a dynamic user input to select a first object from a plurality of objects to display within a message thread of the interactive chat interface, the message thread comprising a display of a list of ordered messages between the first user and at least one second user;
 in response to receiving the user input selecting the first object to display within the message thread, presenting, by the user interface component on a mobile device, a representation of the first object within a message thread of the interactive chat interface at least in part by integrating the representation of the first object within the display of the list of ordered messages;
 receiving, by the user interface component from the first user via the first device, a user input specifying a first user interface action associated with the representation of the first object, the first user interface action comprising an animation performed by the representation of the first object;

setting, by the user interface component, a target element, separate from the representation of the first object, in the interactive chat interface upon which the representation of the first object is to apply the first user interface action, wherein the target element is shown in a display of the interactive chat interface on a second device;

and triggering, by the user interface component, execution of the first user interface action on the target element, wherein the first user interface action dynamically affects a visualization of the target element shown in the display of the interactive chat interface on the second device, wherein the execution of the first user interface action renders a display of the animation of the representation of the first object performing the first user interface action on the target element, wherein:

the animation comprises simulation of an action being performed on the target element shown in the display of the interactive chat interface on the second device and includes movement relative to the target element, and the simulation occurs in a display of the message thread on the second device.

24. A system for providing an interactive chat interface, the system comprising:

a memory;

at least one processor coupled to the memory; a user interface component executed by the at least one processor and configured to:

receive, from a first user via a first device, a dynamic user input to select a first object from a plurality of objects to communicate to a second user and a respective messaging application;

in response to receiving the user input selecting the first object, cause a representation of the first object to be presented within a message thread of the interactive chat interface at least in part by integrating the representation of the first object within a display of ordered messages between the first user and the second user in the message thread;

receive, from the first user via the first device, a user input specifying a first user interface action associated with the representation of the first object, the first user interface action comprising an animation to be rendered in the interactive chat interface;

set a display target, separate from the representation of the first object upon which the first user interface action is to be performed, wherein the display target is shown at least in part in an interactive interface of a second device associated with a second user;

and trigger execution of the first user interface action to act on the display target, wherein the first user interface action dynamically affects a visualization of the display target shown at least in part in the interactive interface of the second device, wherein execution of the first user interface action includes rendering a display of an animation of the first user interface action being performed on the display target, wherein:

the animation comprises a simulation of an action being performed on the display target shown at least in part in the interactive interface of the second device and includes movement relative to the target element, and the simulation occurs in a message thread of the second device.

* * * * *